(12) United States Patent
Tang

(10) Patent No.: US 12,133,100 B2
(45) Date of Patent: Oct. 29, 2024

(54) WIRELESS COMMUNICATION METHOD AND DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 377 days.

(21) Appl. No.: 17/564,267

(22) Filed: Dec. 29, 2021

(65) Prior Publication Data

US 2022/0124527 A1    Apr. 21, 2022

Related U.S. Application Data

(63) Continuation of application No. PCT/CN2019/097158, filed on Jul. 22, 2019.

(51) Int. Cl.
*H04W 24/08* (2009.01)
*H04B 17/318* (2015.01)
*H04W 24/10* (2009.01)
*H04W 36/00* (2009.01)
*H04W 36/30* (2009.01)

(52) U.S. Cl.
CPC .......... *H04W 24/08* (2013.01); *H04W 24/10* (2013.01); *H04B 17/318* (2015.01); *H04W 36/0088* (2013.01); *H04W 36/30* (2013.01); *H04W 36/302* (2023.05)

(58) Field of Classification Search
CPC . H04W 24/08; H04W 24/10; H04W 36/0088; H04W 36/30; H04W 36/302; H04W 24/02; H04W 36/00837; H04W 36/36; H04B 17/318
See application file for complete search history.

(56) References Cited

U.S. PATENT DOCUMENTS

| | | | | |
|---|---|---|---|---|
| 9,344,940 B2* | 5/2016 | Belschner | ............... | H04L 43/16 |
| 9,980,186 B2* | 5/2018 | Da Silva | ........... | H04W 36/0088 |
| 10,070,362 B2* | 9/2018 | Kwan | .................... | H04W 36/22 |
| 11,240,103 B2* | 2/2022 | Chi | ....................... | H04W 24/02 |
| 11,658,880 B2* | 5/2023 | Ghadimi | ............... | H04W 24/02 |
| | | | | 709/224 |
| 2017/0325140 A1* | 11/2017 | Da Silva | ............. | H04W 36/302 |

(Continued)

FOREIGN PATENT DOCUMENTS

| CN | 102934479 | 2/2013 |
|---|---|---|
| CN | 106454961 | 2/2017 |

(Continued)

OTHER PUBLICATIONS

Intel Corporation, "Performance evaluation of conditional handover", 3GPP TSG RAN WG2 Meeting #104, R2-1816692, Nov. 8-12, 2018, pp. 1-4.

(Continued)

*Primary Examiner* — Brian T O Connor
(74) *Attorney, Agent, or Firm* — JCIP GLOBAL INC.

(57) ABSTRACT

A wireless communication method and device. The method comprises: a first node determines information of at least one cell according to first indication information, wherein the first indication information is used for indicating model parameters.

20 Claims, 4 Drawing Sheets

(56) References Cited

U.S. PATENT DOCUMENTS

2020/0008117 A1* 1/2020 Yang ................. H04W 36/0072
2020/0162956 A1* 5/2020 Cui ....................... H04W 16/28

FOREIGN PATENT DOCUMENTS

| WO | 2014111189 | 7/2014 |
| --- | --- | --- |
| WO | 2018170853 | 9/2018 |
| WO | 2019042223 | 3/2019 |

OTHER PUBLICATIONS

China Telecom, "Simulation of key parameters impact for conditional handover", 3GPP TSG-RAN WG2 Meeting #105, R2-1900974, Feb. 25-Mar. 1, 2019, pp. 1-4.

"Search Report of Counterpart Europe Application No. 19938829.9", issued on May 12, 2022, p. 1-p. 21.

"Office Action of Europe Counterpart Application, Application No. 19938829.9", issued on Sep. 20, 2023, pp. 1-11.

"Office Action of Europe counterpart application No. 19938829.9", issued on Aug. 16, 2022, pp. 1-19.

"International Search Report (Form PCT/ISA/210) of PCT/CN2019/097158", mailed on Apr. 13, 2020, with English translation thereof, pp. 1-7. International Searching Authority (Form PCT/ISA/237) of PCT/2020, with English translation thereof, pp. 1-6.

"Written Opinion of the International Searching Authority (Form PCT/ISA/237) of PCT/CN2019/097158", mailed on Apr. 13, 2020, with English translation thereof, pp. 1-6.

\* cited by examiner

200

| a first node determines information of at least one cell according to first indication information, wherein the first indication information is used for indicating model parameters | — S210 |

| a second node sends first indication information to a first node, the first indication information is used for indicating model parameters, and the first indication information is used for determining information of at least one cell by the first node | — S310 |

FIG. 5 device 400 determination circuit 410

FIG. 6 device 500 communication circuit 510

FIG. 7

WIRELESS COMMUNICATION METHOD AND DEVICE

CROSS-REFERENCE TO RELATED APPLICATIONS

This application is a continuation of international PCT application serial no. PCT/CN2019/097158, filed on Jul. 22, 2019. The entirety of each of the above-mentioned patent applications is hereby incorporated by reference herein and made a part of this specification.

BACKGROUND

Technical Field

The embodiments of the disclosure relate to the field of communication, and in particular, to a wireless communication method and device.

Description of Related Art

The terminal device may report a measurement report to the network device based on the measurement result of the neighboring cell, and the network device may then trigger a handover process after receiving the measurement report. This handover mechanism may be called a basic handover mechanism. However, after reporting the measurement report and before receiving the handover command, the terminal device has to wait for a period of time. If the channel quality of the source cell is too poor to receive the handover command during this period, this handover may fail.

In order to reduce the handover delay, a handover mechanism of conditional handover is introduced. To be specific, the network device may be configured with two triggering conditions, namely, the first triggering condition and the second triggering condition. The first triggering condition is used to trigger the terminal device to perform measurement reporting and correspondingly trigger the network side to perform handover preparation and resource reservation, and the second triggering condition is used to trigger the terminal device to switch to the target cell, that is, to perform the handover. However, if the quality of the serving cell where the terminal device is located is fading slowly, it may cause the terminal device to trigger unnecessary measurement reports prematurely as well as unnecessary handover preparation and resource reservation, and system performance may thus be affected.

SUMMARY

The embodiments of the disclosure provide a wireless communication method and device capable of adaptively determining handover conditions and thus contributing to improvement of system performance.

In the first aspect, the disclosure provides a wireless communication method, and the method includes the following step. A first node determines information of at least one cell according to first indication information, where the first indication information is used for indicating model parameters.

In the second aspect, the disclosure provides a wireless communication method, and the method includes the following step. A second node sends first indication information to a first node, where the first indication information is used for indicating model parameters, and the first indication information is used for determining information of at least one cell by the first node.

In the third aspect, the disclosure provides a wireless communication device used for executing the first aspect or the method in any possible implementation of the first aspect. To be specific, the device includes a unit for executing the first aspect or any possible implementation of the first aspect.

In the fourth aspect, the disclosure provides a wireless communication device used for executing the second aspect or the method in any possible implementation of the second aspect. To be specific, the device includes a unit for executing the second aspect or any possible implementation of the second aspect.

In the fifth aspect, the disclosure provides a wireless communication device, and the device includes a processor and a memory. The memory is used for storing a computer program, and the processor is used for calling and running the computer program stored in the memory to execute the first aspect or the method in the implementation thereof.

In the sixth aspect, the disclosure provides a wireless communication device, and the device includes a processor and a memory. The memory is used for storing a computer program, and the processor is used for calling and running the computer program stored in the memory to execute the second aspect or the method in the implementation thereof.

In the seventh aspect, the disclosure provides a chip used for executing any aspect from the first aspect to the second aspect or the method in the implementation thereof.

To be specific, the chip includes a processor configured to call and run a computer program from a memory, such that a device installed with the chip executes any aspect from the first aspect to the second aspect or the method in the implementation thereof.

In the eighth aspect, the disclosure provides a computer-readable storage medium used for storing a computer program, and the computer program enables a computer to execute any aspect from the first aspect to the second aspect or the method in the implementation thereof.

In the ninth aspect, the disclosure provides a computer program product including a computer program instruction, and the computer program instruction enables a computer to execute any aspect from the first aspect to the second aspect or the method in the implementation thereof.

In the tenth aspect, the disclosure provides a computer program, and when running on a computer, the computer program enables the computer to execute any aspect from the first aspect to the second aspect or the method in the implementation thereof.

Based on the above technical solution, the first node may construct a handover model according to the model parameters and further determines the handover triggering condition according to the handover model. Compared with the existing conditional handover mechanism which only relies on a network pre-configured threshold, an optimal handover triggering condition may be adaptively determined according to changes in the channel environment, and based on this handover triggering condition, system performance may be further improved through cell handover.

BRIEF DESCRIPTION OF THE DRAWINGS

FIG. 4 is a schematic chart of a wireless communication method provided by an embodiment of the disclosure.

FIG. 5 is a schematic flow chart of a wireless communication method provided by an embodiment of the disclosure.

FIG. 6 is a schematic block view of a wireless communication device provided by an embodiment of the disclosure.

FIG. 7 is a schematic block view of a wireless communication device provided by an embodiment of the disclosure.

DESCRIPTION OF THE EMBODIMENTS

The technical solutions in the embodiments of the disclosure will be described below in combination with the drawings in the embodiments of the disclosure. Obviously, the described embodiments are part of the embodiments of the disclosure, rather than all of the embodiments. Based on the embodiments in the disclosure, all other embodiments obtained by a person having ordinary skill in the art without creative effort shall fall within the protection scope of the disclosure.

The technical solutions of the embodiments of the disclosure may be applied to various communication systems, such as a global system of mobile communication (GSM), a code division multiple access (CDMA) system, a wideband code division multiple access (WCDMA) system, a general packet radio service (GPRS), a long term evolution (LTE) system, a LTE frequency division duplex (FDD) system, a LTE time division duplex (TDD), a universal mobile telecommunication system (UMTS), a worldwide interoperability for microwave access (WiMAX) communication system, or a 5G system and the like.

It should be understood that the technical solutions of the embodiments of the disclosure may also be applied to a device to device (D2D) communication system, such as an Internet of Vehicles system based on long term evolution (LTE) for D2D communication or a NR-V2X system. Unlike the conventional LTE system in which communication data between terminals is received or sent through network equipment (e.g., a base station), an Internet of Vehicles system adopts terminal-to-terminal direct communication, so it has higher spectrum efficiency and lower transmission delay.

Figure 1:
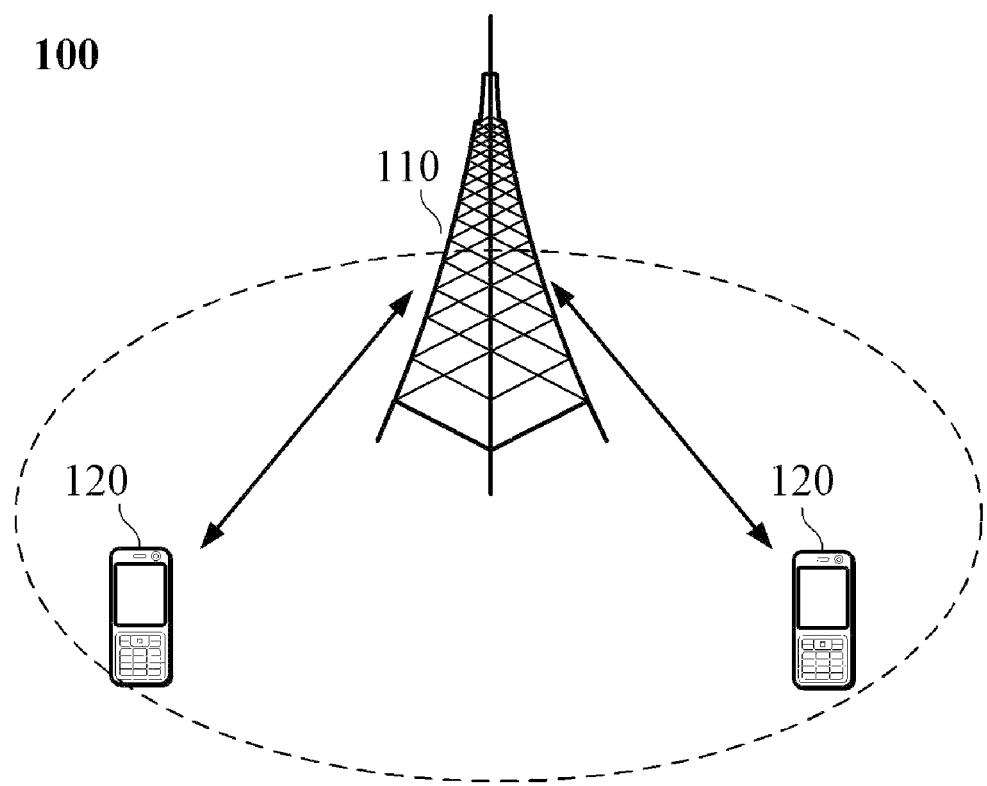
FIG. 1 is a schematic view of an application scenario provided by an embodiment of the disclosure.

Exemplarily, a communication system 100 applied in the embodiments of the disclosure is shown in FIG. 1. The communication system 100 may include a network device 110, and the network device 110 may be a device communicating with terminal devices 120 (or called communication terminals or terminals). The network device 110 may provide communication coverage for a specific geographic area and may communicate with terminal devices located in this coverage area. Optionally, the network device 110 may be a base station (base transceiver station, BTS) in a GSM system or a CDMA system, a base station (NodeB, NB) in a WCDMA system, or an evolutional base station (evolutional Node B, eNB, or eNodeB) in a LTE system, or a wireless controller in a cloud radio access network (CRAN), or the network device may be a mobile switching center, a relay station, an access point, a vehicle-mounted device, a wearable device, a hub, a switch, a bridge, a router, a network side device in a 5G network, or a network device in a public land mobile network (PLMN) that evolves in the future.

The communication system 100 also includes at least one terminal device 120 located within the coverage area of the network device 110. The "terminal device" used herein includes, but not limited to, connection via a wired line such as via a public switched telephone network (PSTN), a digital subscriber line (DSL), a digital cable, direct cable connection, and/or another data connection/network, and/or via a wireless interface such as a cellular network, a wireless local area network (WLAN), a digital television network such as a DVB-H network, a satellite network, an AM-FM broadcast transmitter, and/or another terminal device set to receive/transmit communication signals, and/or an Internet of Things (IoT) device. The terminal device set to communicate through a wireless interface may be referred to as a "wireless communication terminal", a "wireless terminal", or a "mobile terminal". Examples of the mobile terminal include, but not limited to, a satellite or cellular phone; a personal communications system (PCS) terminal capable of combining a cellular radio phone with data processing, fax, and data communication capabilities, and may include a radio phone, a pager, Internet/Intranet access, a web browser, a memo pad, a calendar, and/or a PDA of a global positioning system (GPS) receiver, and a conventional laptop and/or palmtop receiver, or other electronic devices including a radio telephone transceiver. The terminal device may refer to an access terminal, user equipment (UE), a user unit, a user station, a mobile station, a mobile platform, a remote station, a remote terminal, mobile equipment, a user terminal, a terminal, a wireless communication device, a user agent, or a user device. The access terminal may be a cellular phone, a cordless phone, a session initiation protocol (SIP) phone, a wireless local loop (WLL) station, a personal digital assistant (PDA), a handheld device with wireless communication functions, a computing device or other processing devices connected to a wireless modem, a vehicle-mounted device, a wearable device, a terminal device in a 5G network, or a terminal device in a PLMN that evolves in the future.

The terminal device in the embodiments of the disclosure may also be a terminal device capable of implementing D2D communication. For instance, the terminal device may be a vehicle-mounted terminal device, a terminal device in a LTE system (LTE UE), a terminal device in a NR network (NR UE), or a terminal device in a public land mobile communication network (PLMN) that evolves in the future, which is not limited in the embodiments of the disclosure.

FIG. 1 schematically illustrates one network device and two terminal devices, and optionally, the communication system 100 may include a plurality of network devices, and the coverage area of each network device may include other numbers of terminal devices, which is not limited in the embodiments of the disclosure.

Optionally, the communication system 100 may further include other network entities such as a network controller and a mobility management entity, which are not limited in the embodiments of the disclosure.

It should be understood that a device with a communication function in the network/system in the embodiments of the disclosure may be referred to as a communication device. Taking the communication system 100 shown in FIG. 1 as an example, the communication device may include the network device 110 and the terminal devices 120 having communication functions. The network device 110 and the terminal devices 120 may be the specific devices described above, and description thereof is not repeated herein. The communication device may also include other devices in the communication system 100, such as other network entities such as a network controller and a mobility management entity, which are not limited in the embodiments of the disclosure.

It should be understood that the terms "system" and "network" in the specification may be used interchangeably most of the time in the specification. The term "and/or" in the specification is merely an association relationship that describes the associated objects, indicating that there may be three types of relationships. For instance, A and/or B may mean that: A alone exists, A and B exist at the same time, and B exists alone. Besides, the character "/" in the specification generally indicates that the associated objects before and after are in an "or" relationship.

It can be seen from the above description that in the basic handover mechanism, there may be situations in which a terminal device cannot receive a handover command in time, resulting in handover failure. Therefore, a handover mechanism of conditional handover is introduced to reduce the handover delay.

Figure 2:
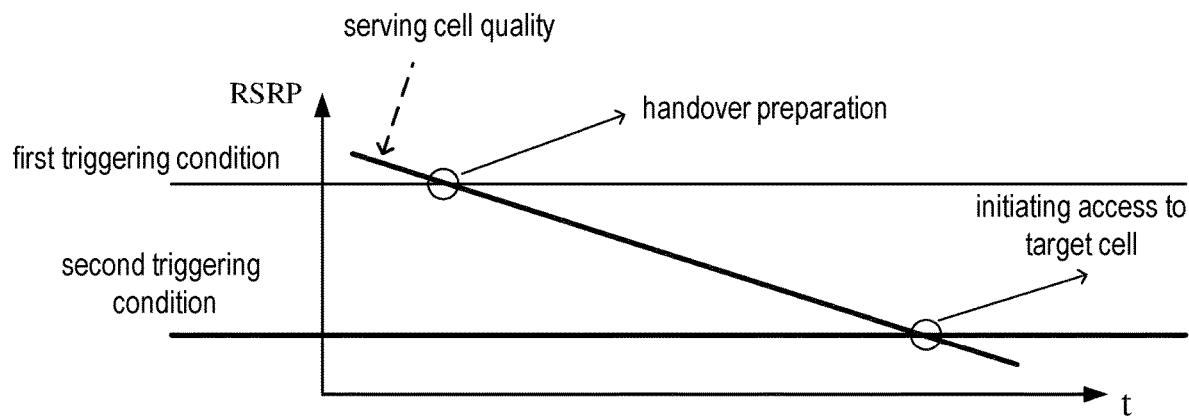
FIG. 2 is a schematic flow graph of a conditional handover mechanism.

FIG. 2 is a schematic graph of a handover mechanism of conditional handover. A first triggering condition may be used for handover preparation and resource reservation between a serving cell and a neighboring cell, that is, resources are reserved for the access of the terminal device, that is, the handover preparation phase. A second triggering condition is used for the terminal device to initiate access to a target cell, that is, the execution phase of the handover. When the second triggering condition is reached, the terminal device does not need to wait for a handover command to initiate access to the target cell as in the basic handover mechanism, but may directly initiate access to the target cell when the second triggering condition is met.

Figure 3:
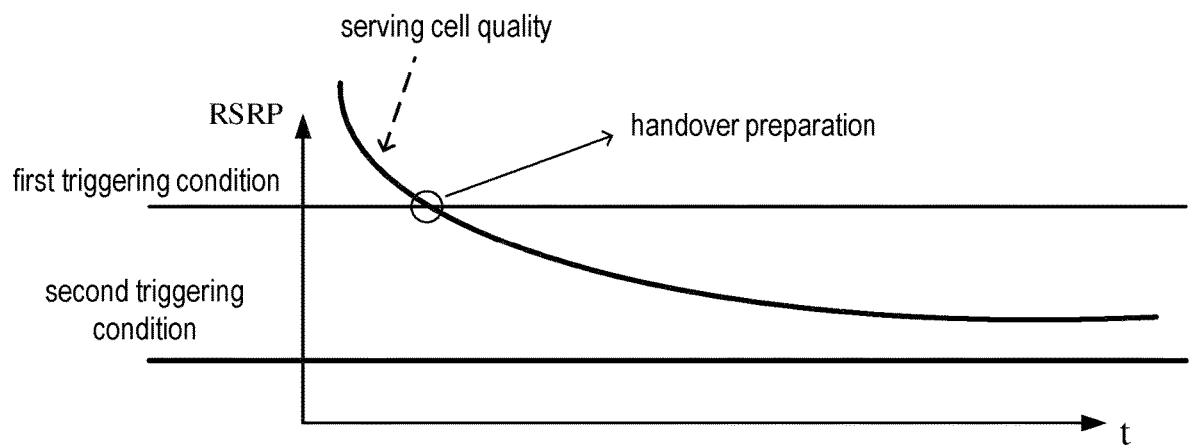
FIG. 3 is a schematic graph of a condition handover situation.

The first triggering condition may be a first threshold of quality of the serving cell, such as, reference signal receiving power (RSRP), and the second triggering condition may be a second threshold of the quality of the serving cell, where the first threshold is greater than the second threshold. When the terminal device detects that the quality of the serving cell meets the first threshold, it can trigger a measurement report to the network device and trigger the target cell to prepare for handover. However, if the quality of the serving cell is slowly fading, as shown in FIG. 3, at this time, the terminal device triggers the measurement report prematurely, resulting in unnecessary handover preparation and resource reservation, which affects system performance.

In view of this, the embodiments of the disclosure provide a technical solution capable of flexibly adjusting the handover parameters according to a model and improving system performance.

FIG. 4 is a schematic chart of a wireless communication method provided by an embodiment of the disclosure. A method 200 may be executed by the terminal devices in the communication system shown in FIG. 1, and the method 200 may include at least part of the following content.

In S210, a first node determines information of at least one cell according to first indication information by, where the first indication information is used for indicating model parameters.

Therefore, the first indication information may be used to construct a model, and the first node may determine the information of the at least one cell according to the model. For instance, the first node may input local real-time information into the model to determine the information of the at least one cell. For instance, the first node may input parameters such as current channel quality of a serving cell (i.e., a source cell) of the first node and current channel quality of a neighboring cell into the model and determines the information of the at least one cell according to output of the model. Further, the first node performs operations such as cell reporting (or referred to as measurement reporting) or cell handover according to the information of the at least one cell.

In the embodiments of the disclosure, the first indication information may be used to construct a handover model, and the handover model may be used in any phase of a cell handover process. For instance, the handover model may be applied to a basic handover mechanism, or may also be applied to a preparation phase or an execution phase of the handover mechanism of conditional handover or may also be applied to other cell handover scenarios, which is not limited in the embodiments of the disclosure.

It should be understood that, in the embodiments of the disclosure, the model parameters indicated by the first indication information may also be used to construct a cell reselection or cell selection model. In other words, the first node may also perform cell reselection or cell selection according to the model, and the specific implementation is similar to that of cell handover. In the following, a cell handover scenario is taken as an example for description, but it is not intended to limit the embodiments of the disclosure.

Optionally, in the embodiments of the disclosure, the model that may be constructed by the model parameters indicated by the first indication information may be a machine learning model, a deep learning model, a decision tree model, a support vector machine (SVM) model, or a K-means clustering model, which is not limited by the embodiments of the disclosure.

Optionally, as an embodiment, the first indication information may be used to determine a neural network model. In this case, as an example and rather than a limitation, the model parameters indicated by the first indication information may include at least one of the following: a number of layers of a neural network, a weight coefficient in the neural network, bias information, activation function information (or referred to as a transfer function), normalized processing information, and other information.

Optionally, as another embodiment, the first indication information may be used to determine a convolutional neural network model. In this case, as an example and not a limitation, the model parameters indicated by the first indication information may include at least one of the following: a number of layers of a convolutional neural network, parameter information of each layer in the convolutional neural network, convolution kernel information, a convolution kernel step length, a pooling layer parameter, or may further include parameter information of other layers in the convolutional neural network.

Optionally, in the embodiments of the disclosure, the at least one cell determined by the first node based on the first indication information may be used for measurement reporting of the terminal or may also be used for cell handover of the terminal.

Optionally, in the embodiments of the disclosure, the first indication information may include first information and/or third information. The first information may be used to indicate a first model parameter, and the third information may be used to indicate a second model parameter. The first information may be used to determine a first model, and the third information may be used to determine a second model. The first model and the second model may be used in different phases of cell handover. To facilitate distinction and description, the cell measured and reported by the terminal device is called a candidate cell, and the cell where the terminal device performs cell accessing is called a target cell. Then the first node may determine information of the candidate cell according to the first model, and further, the first node may perform measurement reporting based on the information of the candidate cell. The second model may be used by the first node to determine the information of the target cell, and further, the first node may initiate random access to the target cell.

The specific implementation of the first model and the second model are described below in combination with example one and example two.

Example One

First, the specific configuration and content of the first information is explained.

Configuration method one: The first information includes a set of model parameters, and the set of model parameters is used for a plurality of cells on a plurality of frequency points.

That is, a set of model parameters may be configured for the first node, and the set of model parameters may be used to construct the first model, and the first model may be applied to a plurality of cells on a plurality of frequency points. That is, when the serving cell of the first node is any cell on the frequency points, the first model may be used.

Configuration method two: The first information includes a plurality of sets of model parameters, and one set of model parameters among the sets of model parameters is used for a cell on a frequency point.

That is, a plurality of sets of model parameters may be configured for the first node, each set of model parameters may be used to construct one first model, the sets of model parameters may be used for constructing a plurality of first models, and each first model is applied to the cell on one frequency point. For instance, when the serving cell of the first node is a first frequency point, the first node may use the first model corresponding to the first frequency point.

Configuration method three: The first information includes a set of first type model parameters and a plurality of sets of second type model parameters, the first type model parameters are used for a plurality of cells on a plurality of frequency points, and one set of second type model parameters among the sets of second type model parameters is used for a cell on a frequency point.

Configuration method four: The first information includes a set of first type model parameters and a plurality of sets of second type model parameters, the first type model parameters are used for a plurality of cells on a plurality of frequency points, and the sets of second type model parameters are used for different cells on a same frequency point.

That is, a set of shared model parameters and a plurality of sets of differentiated model parameters may be configured for the first node. In this way, the first node may determine different models according to the set of shared model parameters and the differentiated model parameters. Further, the first node may determine the model being used according to the frequency point of the current serving cell.

Optionally, in some embodiments, the first model may also be one of the aforementioned various models, such as a neural network model or a convolutional neural network model. For the specific content of the model parameters indicated by the first information, related description may be found with reference to the foregoing paragraphs, and for brevity, details are not repeated herein.

Optionally, in some embodiments, the first information may be configured by a second node. That is, the second node may be configured to construct all model parameters of the first model. Alternatively, in another embodiment, part of information in the first information is configured by the second node, and the other information in the first information is pre-configured. For instance, the differentiated model parameters may be configured by the second node, and the shared model parameters may be pre-configured. Alternatively, in other embodiments, the first information is pre-configured, that is, all model parameters used to construct the first model may be pre-configured.

The first information may be configured in the following ways.

Method one: The first information may be configured through upper layer signaling, such as radio resource control (RRC) signaling.

Method two: The first information may be configured through a broadcast message. For instance, the first information may be configured through a system information block (SIB), and signaling overheads may thus be reduced.

Method three: The first information may be configured through upper layer signaling and a broadcast message. For instance, the first type model parameters may be configured through the SIB, and the sets of second type model parameters may be configured through the RRC signaling.

Optionally, the first information may also be configured in other ways, for example, DCI or MAC CE, which is not limited in the embodiments of the disclosure.

Optionally, in the embodiments of the disclosure, the second node may also update the first information. The update herein may be to update part of or all of the model parameters used to construct the first model. For instance, the second node may update the first information based on one or more of channel quality information of the source cell of the first node, channel quality information of the neighboring cell of the source cell, channel quality change information of the source cell, channel quality change information of the neighboring cell, topology information of the source cell, topology information of the neighboring cell, speed information of the first node, speed information of the source cell, speed information of the neighboring cell, moving direction information of the first node, direction information of the source cell, and direction information of the neighboring cell. In this way, the first node may use a model that is more adapted to the local situation to perform cell reporting, which is conducive to determining a more accurate handover triggering condition, and is conducive to selecting a more suitable candidate cell.

In other embodiments, the second node may also construct a plurality of pieces of the first information. For instance, the second node may construct multiple pieces of the first information based on a plurality of scenarios, the pieces of first information may be used to construct a plurality of first models, and the first models may be applied to different scenarios.

It should be understood that the plurality of scenarios herein may be determined by referring to one or more of the following information: the channel quality information of the source cell, the channel quality information of the neighboring cell, the channel quality change information of the source cell, the channel quality change information of the neighboring cell, the topology information of the source cell, the topology information of the neighboring cell, the speed information of the first node, the speed information of the source cell, the speed information of the neighboring cell, the moving direction information of the first node, the direction information of the source cell, and the direction information of the neighboring cell.

For instance, if the channel quality of the source cell is in a first range and the channel quality of the neighboring cell is in a second range, it belongs to a first scenario, where the channel quality in the first range is greater than the channel quality in the second range. If the channel quality of the source cell is in a third range and the channel quality of the neighboring cell is in a fourth range, it belongs to a second scenario, where the channel quality in the fourth range is greater than the channel quality in the third range. Alternatively, a speed range of the first node greater than a first speed threshold (e.g., 60 Km/h) belongs to a high-speed scenario, and a speed range (e.g., 10 Km/h) of the second node below a second speed threshold belongs to a low-speed scenario, etc.

Optionally, in some embodiments, the second node may configure all the pieces of first information to the first node, and the second node may activate the first node to use one or more first models among the plurality of first models through activation signaling. Optionally, the activation signaling may be dynamic signaling such as RRC signaling, downlink control information (DCI), or a media access control (MAC) control element (CE). Alternatively, the first node may independently select appropriate first information according to the actual scenario and constructs the first model suitable for the current scenario. Optionally, the second node may configure applicable scenario information of the plurality of first information at the same time as configuring the plurality of first information, such as the channel quality range of the applicable source cell, the speed range of the first node, the network topology, etc.

Optionally, in some other embodiments, the second node may also configure only one piece of the first information for the first node at a time. When the scenario where the first node is located changes, the second node may configure the first node with another piece of first information that is more suitable for the current scenario for the first node to construct another first model. When new model parameters are received, the first node may stop using the first model constructed by the first information configured before and starts using the first model constructed by the new model parameters.

Optionally, in the embodiments of the disclosure, step S210 may specifically include the following step.

The first node determines information of at least one first cell according to the first model, and the at least one cell includes the at least one first cell.

In some embodiments, the at least one first cell may be used for the terminal device to perform measurement reporting, in other words, cell reporting. That is, the first node may report the information of the at least one first cell to the second node.

To be specific, the first node may determine first output information of the first model according to the first model and further determines the information of the at least one first cell according to the first output information.

Alternatively, the first node may also directly determine the information of the at least one first cell according to the first model.

Optionally, in some embodiments, input parameters of the first model may include at least one as follows:
the channel quality information of the source cell of the first node, the channel quality information of the neighboring cell of the source cell, the channel quality change information of the source cell, the channel quality change information of the neighboring cell, the topology information of the source cell, the topology information of the neighboring cell, the speed information of the first node, the speed information of the source cell, the speed information of the neighboring cell, the moving direction information of the first node, the direction information of the source cell, the direction information of the neighboring cell, and historical handover information.

Optionally, in some embodiments, the first node may be a terminal device, and the source cell may be a cell currently serving the terminal device, that is, a serving cell.

The historical handover information may include historical handover information of the source cell (e.g., handover conditions for handover from the source cell to the neighboring cell in a historical event of successful handover and handover conditions used in a historical event of a handover failure), historical handover information of the first node (e.g., information of the target cell to which the first node successfully hands over in a historical event of successful handover and information of the target cell to which the first node initiates random access in a historical event of a handover failure), or historical handover information of the neighboring cell.

Optionally, in example one, the first information may also include first parameter indication information, the first parameter indication information is configured for indicating an input parameter type of the first model, and the first parameter indication information may be configured by the second node or may be pre-configured.

Optionally, the input parameter type of the first model includes at least one as follows:
the channel quality information of the source cell of the first node, the channel quality information of the neighboring cell of the source cell, the channel quality change information of the source cell, the channel quality change information of the neighboring cell, the topology information of the source cell, the topology information of the neighboring cell, the speed information of the first node, the speed information of the source cell, the speed information of the neighboring cell, the moving direction information of the first node, the direction information of the source cell, the direction information of the neighboring cell, and historical handover information.

The first node may determine the parameter type inputted to the first model based on the first parameter indication information and may further input a value of the parameter type to the first model. For instance, if the inputted parameter type includes the channel quality information of the source cell, the first node may input the value of the current channel quality of the source cell, such as RSRP, into the first model. For another instance, if the inputted parameter type includes the speed information of the first node, the first node may input the current speed information of the first node into the first model.

After the above-mentioned input parameters are inputted into the first model, the first output information may be obtained, and acting as an example not a limitation, the first output information may include at least one as follows:
a first triggering condition, information of at least one second cell, and priority information of the at least one second cell.

The first triggering condition may be used to control measurement reporting or cell reporting of the first node. In a specific embodiment, the first triggering condition may correspond to the first triggering condition in a handover preparation phase of a conditional handover mechanism.

Optionally, the first triggering condition may include one or more threshold values, and these threshold values may be used to determine whether the quality of the serving cell and/or whether the quality of the neighboring cell meets the triggering condition of the measurement report. Optionally, the first triggering condition may include at least one as follows:

a channel quality threshold of the serving cell;
a channel quality threshold of the neighboring cell;
a difference threshold between channel quality of the serving cell and channel quality of the neighboring cell.

For instance, measurement reporting may be triggered if the channel quality of the serving cell is lower than the first threshold, or measurement reporting may be triggered if the channel quality of the neighboring cell is greater than the second threshold. Alternatively, if the channel quality of the serving cell is lower than the first threshold and the channel quality of the neighboring cell is greater than the second threshold, measurement reporting may be triggered.

For another instance, if the channel quality of the serving cell is a first value, the channel quality of the neighboring cell is a second value, and if the first value is greater than the second value. If the quality of the serving cell deteriorates, and if a difference value between the first value and the second value is less than a third threshold, that is, the channel quality of the serving cell is equivalent to the channel quality of the neighboring cell, measurement reporting may be triggered.

For still another instance, if the channel quality of the serving cell is the first value, the channel quality of the neighboring cell is the second value, and if the first value is equivalent to the second value. If the quality of the serving cell starts to deteriorate, and if the difference value between the first value and the second value is greater than a fourth threshold, that is, the channel quality of the serving cell is much worse than that of the neighboring cell, measurement reporting may be triggered.

Optionally, in example one, the first triggering condition may be used to determine the information of the candidate cell reported to the second node. For instance, the first node may determine that a cell satisfying the first triggering condition among neighboring cells is a candidate cell for measurement reporting, that is, the candidate cell includes a cell satisfying the first triggering condition. For instance, the candidate cells may include neighboring cells whose channel quality is greater than the second threshold.

Further, second information reported by the first node may include the information of the candidate cell determined according to the first triggering condition, for example, a cell identify (ID) such as a physical cell ID (PCI). Optionally, a measurement result of the candidate cell may further be included, for example, the channel quality of the candidate cell such as RSRP, reference signal receiving quality (RSRQ), an interference plus noise ratio (SINR), or information such as priority information of the candidate cell. The priority information of the candidate cell may be determined according to the measurement result of the candidate cell.

Optionally, in some embodiments, if the first output information includes the information of the at least one second cell, the first node may determine part of or all of the cells in the at least one second cell as candidate cells to be reported. For instance, the first node may select a part of the cells with optimal channel quality among the at least one second cell as the candidate cells for reporting. Optionally, if the first output information includes the priority information of the at least one second cell, the first node may also select the candidate cell to be reported in the at least one second cell according to the priority information of the at least one second cell. For instance, the first node may only report the K cells with the highest priority, and K is a positive integer.

In this case, the second information reported by the first node may include information of the candidate cell determined according to the at least one second cell, for example, the cell ID. Optionally, the measurement result of the candidate cell or the priority information of the candidate cell, etc. may also be included.

Optionally, in example one, the first node may also report first capability information. To be specific, the first node may report the first capability information to the second node, and the first capability information is used for indicating whether the first node supports cell reporting according to the first model.

Optionally, if the first node supports cell reporting according to the first model, the second node may configure the first information for the first node. Alternatively, if the first node does not support cell reporting according to the first model, the second node may not configure the first information to the first node. In this case, the first node may use an existing measurement reporting method (for example, scenario handover for a condition), and the first node may perform measurement reporting based on the first triggering condition configured by the network.

In the embodiments of the disclosure, after the first node reports the second information, the subsequent handover procedure adopts the handover procedure of example two described below or may adopt an existing handover procedure. For instance, in some embodiments, after receiving the second information reported by the first node, the second node may trigger the first node for handover based on the second information. For instance, the second node may send a handover command to the first node, and the handover command may also include the information of the target cell. After receiving the handover command, the first node may initiate random accessing to the target cell, where the target cell may be selected from candidate cells reported by the first node. Alternatively, in some other embodiments, after receiving the second information reported by the first node, the second node may perform handover based on the second triggering condition configured by the network. For instance, after the second triggering condition is met, the first node initiates random accessing to the target cell, where the target cell may be a cell that satisfies the second triggering condition, for example, a cell whose channel quality is greater than a specific threshold.

Therefore, in the embodiments of the disclosure, the second node may provide the first model adapted to the current scenario according to local characteristics (or the current scenario), that is, each cell may configure different handover models for the terminal device in combination with its own local characteristics. After obtaining the handover model based on local characteristics, the terminal device then combines the current local situation of the terminal device, such as the measurement result of the cell, the speed information of the terminal device, the topology information of the cell, etc., to generate the optimal condition handover decision currently adapted to the local situation. That is, the second node may provide a local model, and the terminal device uses the local information as the input information of the model and ultimately outputs a handover decision suitable for the actual scenario. Compared with the existing conditional handover mechanism which only relies on a network pre-configured threshold, an optimal handover triggering condition may be adaptively determined according to changes in the channel environment, and based on this handover triggering condition, system performance may be further improved through cell handover.

Example Two

It should be understood that, in example two, the third information may be determined by the second node according to the information of the candidate cell reported by the first node. For instance, the second node may determine the model parameters corresponding to some of or all of the cells in the candidate cell according to the information of the candidate cell and further configure the model parameters to the first node through the third information.

Note that the information of the candidate cell may be determined in the manner described in example one or may also be determined in an existing manner, for example, determined according to the measurement result of the neighboring cell, which is not particularly limited in the embodiments of the disclosure.

It should be understood that in example two, the third information may be used to determine the second model. The second model may correspond to at least one fourth cell, and the at least one fourth cell may be determined by the second node according to the candidate cell reported by the first node. For instance, the at least one fourth cell includes some of or all of the cells in the candidate cell.

The specific configuration and content of the third information is explained as follows.

Configuration method one: The third information includes a set of model parameters, and the set of model parameters is used for each cell in the at least one fourth cell.

That is, a set of model parameters may be configured for the first node, the set of model parameters may be used to construct the second model, and the second model may be applied to each cell in the at least one fourth cell.

Configuration method two: The at least one fourth cell includes a plurality of fourth cells, the third information includes a plurality of sets of model parameters, and one set of model parameters among the sets of model parameters is used for one cell in the at least one fourth cell.

That is, a plurality of sets of model parameters may be configured for the first node, each set of model parameters may be used to construct one second model, the sets of model parameters may be used for constructing a plurality of second models, and each second model is applied to one cell in the at least one fourth cell.

Configuration method three: If the at least one fourth cell includes plural fourth cells, the third information includes a set of first type model parameters and a plurality of sets of second type model parameters, the set of model parameters is used for each cell in the at least one fourth cell, and one set of second type model parameters among the sets of second type model parameters is used for one cell in the at least one fourth cell.

That is, a set of shared model parameters and a plurality of sets of differentiated model parameters may be configured for the first node. In this way, the first node may determine different models according to the set of shared model parameters and the differentiated model parameters.

Optionally, in some embodiments, the second model may also be one of the aforementioned various models, such as a convolutional neural network model. For the specific content of the model parameters indicated by the third information, related description may be found with reference to the foregoing paragraphs, and details are not repeated herein.

Optionally, in some embodiments, the third information may be configured by the second node. That is, the second node may be configured to construct all model parameters of the second model. Alternatively, in another embodiment, part of information in the third information is configured by the second node, and the other information in the third information is pre-configured. For instance, the differentiated model parameters may be configured by the second node, and the shared model parameters may be pre-configured. Alternatively, in other embodiments, the third information is pre-configured, that is, all model parameters used to construct the second model may be pre-configured.

The third information may be configured in the following ways.

Method one: The third information may be configured through upper layer signaling, such as RRC signaling.

Method two: The third information may be configured through a broadcast message, for example, may be configured through a SIB, and signaling overheads may thus be reduced.

Method three: The third information may be configured through upper layer signaling and a broadcast message. For instance, the first type model parameters may be configured through the SIB, and the sets of second type model parameters may be configured through the RRC signaling.

Optionally, in example two, step S210 may specifically include the following step.

The first node determines information of at least one third cell according to the second model, and the at least one cell includes the at least one third cell.

In some embodiments, the at least one third cell may be used by the terminal device to determine a target cell for cell accessing.

To be specific, the first node may determine second output information of the second model according to the second model and further determines the information of the at least one third cell according to the second output information.

Optionally, in some embodiments, input parameters of the second model may include at least one as follows:

the channel quality information of the source cell of the first node, the channel quality information of the neighboring cell of the source cell, the channel quality change information of the source cell, the channel quality change information of the neighboring cell, the topology information of the source cell, the topology information of the neighboring cell, the speed information of the first node, the speed information of the source cell, the speed information of the neighboring cell, the moving direction information of the first node, the direction information of the source cell, the direction information of the neighboring cell, and historical handover information.

Note that the neighboring cell herein may be the cell in the at least one fourth cell described above, where the at least one fourth cell includes part of or all of the cells in the at least one first cell reported by the first node. That is, the at least one fourth cell may be obtained by the second node through reselecting the candidate cell reported by the first node. For instance, the second node may determine the at least one fourth cell according to information such as the measurement result or priority of the candidate cell reported by the first node.

It should be understood that the meanings of other input parameters of the second model may be found with reference to the meanings of input parameters of the first model. For brevity, details are not repeated herein.

Optionally, in example two, the third information may also include second parameter indication information, the second parameter indication information is configured for indicating an input parameter type of the second model, and the second parameter indication information may be configured by the second node or may be pre-configured.

Optionally, the input parameter type of the second model includes at least one as follows:

the channel quality information of the source cell of the first node, the channel quality information of the neighboring cell of the source cell, the channel quality change information of the source cell, the channel quality change information of the neighboring cell, the topology information of the source cell, the topology information of the neighboring cell, the speed information of the first node, the speed information of the source cell, the speed information of the neighboring cell, the moving direction information of the first node, the direction information of the source cell, the direction information of the neighboring cell, and the historical handover information.

Note that the neighboring cell described herein may be a cell in the at least one fourth cell described in the foregoing paragraphs, and the at least one fourth cell includes part of or all cells in the at least one first cell reported by the first node.

The first node may determine the parameter type inputted to the second model based on the second parameter indication information and may further input a value of the parameter type to the second model. For instance, if the inputted parameter type includes the channel quality information of the source cell, the first node may input the value of the current channel quality of the source cell, such as RSRP, RSRQ, or SINR, into the second model. For another instance, if the inputted parameter type includes the speed information of the first node, the first node may input the current speed information of the first node into the second model.

After the above-mentioned input parameters are inputted into the second model, the second output information may be obtained, and acting as an example rather than a limitation, the second output information may include at least one as follows:

a second triggering condition and information of at least one fifth cell.

Optionally, the second output information may also include priority information of the at least one fifth cell.

The second triggering condition may be configured for controlling cell accessing of the first node. In a specific embodiment, the second triggering condition may correspond to the second triggering condition in a handover execution phase of the conditional handover mechanism.

Optionally, the second triggering condition may include one or more threshold values, and the one or more threshold values may be used to determine whether the quality of the serving cell and/or whether the quality of the neighboring cell meets the triggering condition of cell accessing. Optionally, the second triggering condition may include at least one as follows:

channel quality of a target cell is greater than a first threshold value, a difference value between the channel quality of the target cell and the channel quality of the serving cell is greater than a second threshold value, and the channel quality of the serving cell is less than a third threshold value.

For instance, initiation of cell accessing to the target cell may be triggered if the channel quality of the target cell is greater than the first threshold value, initiation of cell accessing to the target cell may be triggered if the channel quality of the serving cell is lower than the third threshold value, or initiation of cell accessing to the target cell may be triggered if the channel quality of the serving cell is lower than the third threshold value and the channel quality of the target cell is greater than the first threshold value.

For still another instance, if the channel quality of the serving cell is the first value, the channel quality of the target cell is the second value, and if the first value is equivalent to the second value. If the quality of the serving cell starts to deteriorate, and if the difference value between the first value and the second value is greater than the second threshold, that is, the channel quality of the target cell is much better than that of the serving cell, the target cell may be triggered to initiate random accessing.

Optionally, in example one, the second triggering condition may be used to determine the information of the target cell for cell accessing by the second node. For instance, the first node may determine the cell satisfying the second triggering condition in the at least one fourth cell is the target cell, that is, the target cell includes the cell satisfying the second triggering condition. For instance, the target cell may include the neighboring cell whose channel quality is greater than the first threshold value.

Optionally, in some embodiments, if the second output information includes the information of the at least one fifth cell, the first node may determine part of or all of the cells in the at least one fifth cell as the target cells for cell accessing. Optionally, if the first output information includes the priority information of the at least fifth second cell, the first node may select the target cell for cell accessing in the at least one fifth cell according to the priority information of the at least one fifth cell. For instance, the first node may determine the cell with the highest priority as the target cell. Further, the first node may initiate random accessing to the target cell. For instance, the first node may initiate random accessing to the target cell immediately or may initiate random accessing to the target cell after a certain period of time.

Optionally, in example two, the first node may also report second capability information. To be specific, the first node may report the second capability information to the second node, and the first capability information is used for indicating whether the first node supports cell handover (or cell accessing) according to the second model.

Optionally, if the first node supports cell handover according to the second model, the second node may configure the third information for the first node. Alternatively, if the first node does not support cell handover according to the second model, the second node may not configure the third information to the first node. In this case, the first node may use an existing cell handover method (for example, scenario handover for a condition), and the first node may perform cell handover based on the second triggering condition configured by the network. Alternatively, for a basic handover scenario, the first node may trigger cell handover when receiving a handover command from the network device, that is, initiate accessing to the target cell.

Therefore, the first node triggers the handover preparation phase of the conditional handover based on the first model and local information. Further, the second node may trigger the execution phase of the handover based on the second model and the local information in the determined one or more candidate cells. Therefore, the first node may determine the optimal first triggering condition and the second triggering condition in real time according to the time-varying channel environment, and the handover mechanism of conditional handover is thus optimized and system performance is improved in this way.

In the following, in combination with example three, the optimization mechanism of the first information and the third information is described.

In some cases, the handover procedure triggered by the first node according to the first information and/or the third information is not successful or is not an optimal procedure, for example, the handover time is excessively long. Alternatively, after the first node constructs the first model based on the first information, the decision based on the input parameters of the first model prematurely triggers the preparation phase of the conditional handover, For example, the time interval from handover preparation to handover execution is excessively long, that is, the measurement report is sent to the second node prematurely, and the channel environment where the first node is located does is not kept to be deteriorating thereafter. Alternatively, the channel deterioration is not fast, causing resources on one or more candidate cells to be occupied for a long time, and system performance is affected.

Optionally, in some embodiments, the first node may also report the local information of the first node to the second node. To be specific, the first node may report fifth information, and the fifth information includes at least one as follows:

the channel quality information of the source cell of the first node, the channel quality information of the neighboring cell of the source cell, the channel quality change information of the source cell, the channel quality change information of the neighboring cell, the topology information of the source cell, the topology information of the neighboring cell, the speed information of the device, the speed information of the source cell, the speed information of the neighboring cell, the moving direction information of the device, the direction information of the source cell, the direction information of the neighboring cell, and the historical handover information.

Further, the second node may optimize the first information and/or third information configured for the first node according to the above information when constructing the handover model, so as to gradually optimize system performance.

Optionally, in some embodiments, if handover from a cell A to a cell B performed by the first node fails, the first node may directly report the fifth information to the cell A, and the cell A may optimize the first information and/or the third information according to the fifth information. Alternatively, if the handover performed by the first node is successful, the first node may send the fifth information to the cell B and send the fifth information to the cell A through the cell B, so that the cell A may optimize the model parameters of the first model and/or the second model according to the fifth information.

Optionally, in some embodiments, the method 200 may further include the following step.

The first node reports sixth information, and the sixth information is used for indicating a third model parameter.

That is, the first node may also determine the third model parameter. The third model parameter may include the model parameters used to construct the first model or may also include the model parameters used to construct the second model. The third model parameter may be a model parameter independently determined by the first node according to local information, and the third model parameter may be considered as a model parameter expected by the first node. The first node reports the third model parameter to the second node, so that the second node may optimize the first information and/or the third information according to the third model parameter.

Optionally, in a specific embodiment, the third model parameter includes at least one as follows: a number of layers of a neural network, a weight coefficient in the neural network, bias information, activation function information, normalized processing information, and other information.

Optionally, in another specific embodiment, the third model parameter includes at least one as follows: a number of layers of a convolutional neural network, parameter information of each layer in the convolutional neural network, convolution kernel information, a convolution kernel step length, and a pooling layer parameter.

Therefore, the first node triggers the handover preparation phase of the conditional handover based on the first model and local information. Further, the second node may trigger the execution phase of the handover based on the second model and the local information in the determined one or more candidate cells. Therefore, the first node may determine the optimal first triggering condition and the second triggering condition in real time according to the time-varying channel environment, and the handover mechanism of conditional handover is thus optimized and system performance is improved in this way. Further, the first node may also feed back parameters such as input parameters of the handover model or handover results to the second node. As such, the second node may optimize the first information and the third information configured for the first node according to the feedback information, so that the network performance may be gradually optimized.

The wireless communication method according to the embodiments of the disclosure is described in detail from the perspective of the first node with reference to FIG. 4, and the following describes in detail the wireless communication method according to another embodiment of the disclosure from the perspective of the second node in combination with FIG. 5. It should be understood that the description on the second node side corresponds to the description on the first node side, and similar descriptions may be found with reference to the foregoing paragraphs. In order to avoid repetition, details are not repeated herein.

FIG. 5 is a schematic flow chart of a wireless communication method 300 according to another embodiment of the disclosure. The method 300 may be executed by the network device in the communication system shown in FIG. 1 or by another terminal device in the D2D system, and as shown in FIG. 5, the method 300 includes the following content.

In S310, a second node sends first indication information to a first node, and the first indication information is used for indicating model parameters, and the first indication information is used for determining information of at least one cell by the first node.

Optionally, in some embodiments, the first indication information includes first information, the first information is used for indicating a first model parameter, and the first information is used for determining a first model.

Optionally, in some embodiments, the method may further include the following step.

The second node determines the first information according to at least one as follows:

channel quality information of a source cell of the first node, channel quality information of a neighboring cell of the source cell, channel quality change information of the source cell, channel quality change information of the neighboring cell, topology information of the source cell, topology information of the neighboring cell, speed information of the first node, speed information of the source cell, speed information of the neighboring cell, moving direction information of the first node, direction information of the source cell, direction information of the neighboring cell, and historical handover information.

Optionally, in some embodiments, the first information includes a set of model parameters, and the set of model parameters is used for a plurality of cells on a plurality of frequency points; or the first information includes a plurality of sets of model parameters, and one set of model parameters among the sets of model parameters is used for a cell on a frequency point; or the first information includes a set of first type model parameters and a plurality of sets of second type model parameters, the first type model parameters are used for a plurality of cells on a plurality of frequency points, and one set of second type model parameters among the sets of second type model parameters is used for a cell on a frequency point; or the first information includes a set of first type model parameters and a plurality of sets of second type model parameters, the first type model parameters are used for a plurality of cells on a plurality of frequency points, and the sets of second type model parameters are used for different cells on a same frequency point.

Optionally, the first information is transmitted through upper layer signaling and/or a broadcast message.

Optionally, in some embodiments, the method may further include the following step.

The second node receives first capability information reported by the first node, and the first capability information is used for indicating whether the first node supports cell reporting according to the first model.

Optionally, in some embodiments, the step of sending the first indication information to the first node by the second node further includes the following step.

If the first node supports cell reporting according to the first model, the second node sends the first information to the first node.

Optionally, in some embodiments, the method may further include the following step.

The second node sends fourth information to the first node, the fourth information includes at least part of the model parameters corresponding to the first model, and the fourth information is used for updating the first model by the first node.

Optionally, in some embodiments, the first indication information includes a plurality of pieces of first information, and the pieces of first information are used for determining a plurality of first models.

Optionally, in some embodiments, the method may further include the following step.

The second node sends activation signaling to the first node, and the activation signaling is used for activating at least one first model among the first models.

Optionally, in some embodiments, the activation signaling is one as follows:

downlink control information DCI, radio resource control RRC signaling, and medium access control MAC control element CE.

Optionally, in some embodiments, the method may further include the following step.

The second node receives second information reported by the first node, and the second information includes the information of the at least one first cell. The at least one first cell is determined by the first node according to the first model.

Optionally, in some embodiments, the second information further includes: a measurement result of the at least one first cell and/or priority information of the at least one first cell.

Optionally, in some embodiments, the first information includes first parameter indication information, and the first parameter indication information is configured for indicating an input parameter type of the first model.

Optionally, the input parameter type of the first model includes at least one as follows:

channel quality information of a source cell of the first node, channel quality information of a neighboring cell of the source cell, channel quality change information of the source cell, channel quality change information of the neighboring cell, topology information of the source cell, topology information of the neighboring cell, speed information of the first node, speed information of the source cell, speed information of the neighboring cell, moving direction information of the first node, direction information of the source cell, direction information of the neighboring cell, and historical handover information.

Optionally, in some embodiments, the first indication information includes third information, the third information is used for indicating a second model parameter, and the third information is used for determining a second model.

Optionally, in some embodiments, the method may further include the following step.

The second node determines the third information according to at least one as follows:

the channel quality information of the source cell of the first node, the channel quality information of the neighboring cell of the source cell, the channel quality change information of the source cell, the channel quality change information of the neighboring cell, the topology information of the source cell, the topology information of the neighboring cell, the speed information of the first node, the speed information of the source cell, the speed information of the neighboring cell, the moving direction information of the first node, the direction information of the source cell, the direction information of the neighboring cell, and the historical handover information.

Optionally, in some embodiments, the third information includes second parameter indication information, and the second parameter indication information is configured for indicating an input parameter type of the second model.

Optionally, the input parameter type of the second model includes at least one as follows:

the channel quality information of the source cell of the first node, the channel quality information of the neighboring cell of the source cell, the channel quality change information of the source cell, the channel quality change information of the neighboring cell, the topology information of the source cell, the topology information of the neighboring cell, the speed information of the first node, the speed information of the source cell, the speed information of the neighboring cell, the moving direction information of the first node, the direction information of the source cell, the direction information of the neighboring cell, and the historical handover information.

Optionally, in some embodiments, the neighboring cell is a cell in at least one fourth cell, and the at least one fourth cell includes part of or all cells in the at least one first cell reported by the first node.

Optionally, in some embodiments, the third information includes a set of model parameters, and the set of model parameters is used for each cell in at least one fourth cell; or the third information includes a plurality of sets of model parameters, and one set of model parameters among the sets of model parameters is used for one cell in at least one fourth cell; or the third information includes a set of first type model parameters and a plurality of sets of second type model parameters, the set of model parameters is used for each cell in at least one fourth cell, and one set of second type model parameters among the sets of second type model parameters is used for one cell in the at least one fourth cell.

Optionally, in some embodiments, the at least one fourth cell includes part of or all cells in the at least one first cell reported by the first node.

Optionally, the third information is transmitted through upper layer signaling and/or a broadcast message.

Optionally, in some embodiments, the method may further include the following step.

The second node receives second capability information reported by the first node, and the second capability information is used for indicating whether the first node supports cell handover according to the second model.

Optionally, in some embodiments, the method may further include the following step.

If the first node supports cell switching according to the second model, the second node sends the third information to the first node.

Optionally, in some embodiments, the method may further include the following step.

The second node receives fifth information sent by the first node, and the fifth information includes at least one as follows:

the channel quality information of the source cell of the first node, the channel quality information of the neighboring cell of the source cell, the channel quality change information of the source cell, the channel quality change information of the neighboring cell, the topology information of the source cell, the topology information of the neighboring cell, the speed information of the first node, the speed information of the source cell, the speed information of the neighboring cell, the moving direction information of the first node, the direction information of the source cell, the direction information of the neighboring cell, and the historical handover information.

Optionally, in some embodiments, the method may further include the following step.

The first node reports sixth information, and the sixth information is used for indicating a third model parameter.

Optionally, in some embodiments, the third model parameter includes at least one as follows: a number of layers of a neural network, a weight coefficient in the neural network, bias information, and activation function information.

Optionally, in some embodiments, the third model parameter includes at least one as follows: a number of layers of a convolutional neural network, parameter information of each layer in the convolutional neural network, convolution kernel information, a convolution kernel step length, and a pooling layer parameter.

Optionally, in some embodiments, the model parameters include at least one as follows: a number of layers of a neural network, a weight coefficient in the neural network, bias information, and activation function information.

Optionally, in some embodiments, the model parameters include at least one as follows: a number of layers of a convolutional neural network, parameter information of each layer in the convolutional neural network, convolution kernel information, a convolution kernel step length, and a pooling layer parameter.

Optionally, the first node is a terminal device, and the second node is a network device in the source cell of the first node; or the first node is a first terminal, and the second node is a second terminal.

The method embodiments of the disclosure are described in detail above with reference to FIG. 4 to FIG. 5, and the device embodiments of the disclosure are described in detail below in combination with FIG. 6 to FIG. 10. It should be understood that the device embodiments and the method embodiments correspond to each other, and similar descriptions may be found with reference to the method embodiments.

FIG. 6 is a schematic block view of a wireless communication device 400 according to an embodiment of the disclosure. As shown in FIG. 6, the device 400 includes the following:

a determination circuit 410, used for determining information of at least one cell according to first indication information, where the first indication information is used for indicating model parameters.

Optionally, in some embodiments, the first indication information includes first information, the first information is used for indicating a first model parameter, and the first information is used for determining a first model.

Optionally, in some embodiments, the determination circuit is further configured for:

determining information of at least one first cell according to the first model, where the at least one cell includes the at least one first cell.

Optionally, in some embodiments, the determination circuit is specifically used for:

determining first output information according to the first model and determining the information of the at least one first cell according to the first output information; or determining the information of the at least one first cell according to the first model.

Optionally, in some embodiments, the determination circuit is further configured for:

inputting at least one of channel quality information of a source cell of the first device, channel quality information of a neighboring cell of the source cell, channel quality change information of the source cell, channel quality change information of the neighboring cell, topology information of the source cell, topology information of the neighboring cell, speed information of the device, speed information of the source cell, speed information of the neighboring cell, moving direction information of the device, direction information of the source cell, direction information of the neighboring cell, and historical handover information to the first model to obtain the first output information.

Optionally, in some embodiments, the first output information includes at least one as follows:
  a first triggering condition, information of at least one second cell, and priority information of the at least one second cell.

Optionally, in some embodiments, the at least one first cell includes a cell satisfying the first triggering condition.

Optionally, in some embodiments, the first triggering condition includes at least one as follows:
  a channel quality threshold of a serving cell is less than a first threshold;
  a channel quality threshold of the neighboring cell is greater than a second threshold;
  a difference value between channel quality of the serving cell and channel quality of the neighboring cell is less than a third threshold.

Optionally, in some embodiments, the at least one first cell includes part of or all cells in the at least one second cell.

Optionally, in some embodiments, the first information includes a set of model parameters, and the set of model parameters is used for a plurality of cells on a plurality of frequency points; or
  the first information includes a plurality of sets of model parameters, and one set of model parameters among the sets of model parameters is used for a cell on a frequency point; or
  the first information includes a set of first type model parameters and a plurality of sets of second type model parameters, the first type model parameters are used for a plurality of cells on a plurality of frequency points, and one set of second type model parameters among the sets of second type model parameters is used for a cell on a frequency point; or
  the first information includes a set of first type model parameters and a plurality of sets of second type model parameters, the first type model parameters are used for a plurality of cells on a plurality of frequency points, and the sets of second type model parameters are used for different cells on a same frequency point.

Optionally, in some embodiments, the first information is configured by a second node; or
  part of information in the first information is configured by the second node, and other information in the first information is pre-configured; or
  the first information is pre-configured.

Optionally, in some embodiments, the first information is transmitted through upper layer signaling and/or a broadcast message.

Optionally, in some embodiments, the method device further includes the following:
  a communication circuit, used for reporting first capability information, where the first capability information is used for indicating whether the device supports cell reporting according to the first model.

Optionally, in some embodiments, the device further includes the following:
  a communication circuit, used for receiving fourth information, where the fourth information includes at least part of the model parameters corresponding to the first model;
  where the determination circuit is further used for updating the first model according to the fourth information.

Optionally, in some embodiments, the first indication information includes a plurality of pieces of first information, and the pieces of first information are used for determining a plurality of first models.

Optionally, in some embodiments, the device further includes the following:
  a communication circuit, receiving activation signaling, where the activation signaling is used for activating at least one first model among the first models.

Optionally, in some embodiments, the activation signaling is one as follows:
  downlink control information DCI, radio resource control RRC signaling, and medium access control MAC control element CE.

Optionally, in some embodiments, the device further includes a communication circuit used for reporting second information, where the second information includes the information of the at least one first cell.

Optionally, in some embodiments, the second information further includes: a measurement result of the at least one first cell and/or priority information of the at least one first cell.

Optionally, in some embodiments, the first information includes first parameter indication information, and the first parameter indication information is configured for indicating an input parameter type of the first model.

Optionally, the input parameter type of the first model includes at least one as follows:
  the channel quality information of the source cell of the device, the channel quality information of the neighboring cell of the source cell, the channel quality change information of the source cell, the channel quality change information of the neighboring cell, the topology information of the source cell, the topology information of the neighboring cell, the speed information of the device, the speed information of the source cell, the speed information of the neighboring cell, the moving direction information of the device, the direction information of the source cell, the direction information of the neighboring cell, and the historical handover information.

Optionally, in some embodiments, the first indication information includes third information, the third information is used for indicating a second model parameter, and the third information is used for determining a second model.

Optionally, in some embodiments, the determination circuit is further configured for:
  determining information of at least one third cell according to the second model, where the at least one cell includes the at least one third cell.

Optionally, in some embodiments, the determination circuit is further configured for:
  determining second output information according to the second model and determining the information of the at least one third cell according to the second output information; or
  determining the information of the at least one third cell according to the second model.

Optionally, in some embodiments, the determination circuit is further configured for:
  inputting at least one of the channel quality information of the source cell of the device, the channel quality information of the neighboring cell of the source cell, the channel quality change information of the source cell, the channel quality change information of the neighboring cell, the topology information of the source cell, the topology information of the neighboring cell, the speed information of the device, the speed information of the source cell, the speed information of the neighboring cell, the moving direction information of the device, the direction information of the source cell, the direction information of the neighboring cell, and the historical handover information to the second model to obtain the second output information.

Optionally, in some embodiments, the second output information includes at least one as follows:

a second triggering condition and information of at least one fifth cell.

Optionally, in some embodiments, the at least one third cell includes part of or all cells in the at least one fifth cell.

Optionally, in some embodiments, the at least one third cell includes a cell satisfying the second triggering condition.

Optionally, in some embodiments, the second triggering condition includes at least one as follows:

channel quality of a target cell is greater than a first threshold value, a difference value between the channel quality of the target cell and the channel quality of the serving cell is greater than a second threshold value, and the channel quality of the serving cell is less than a third threshold value.

Optionally, in some embodiments, the device further includes the following:

a communication circuit, configured for initiating random access to a cell in the at least one third cell.

Optionally, in some embodiments, the third information includes a set of model parameters, and the set of model parameters is used for each cell in at least one fourth cell; or the third information includes a plurality of sets of model parameters, and one set of model parameters among the sets of model parameters is used for one cell in at least one fourth cell; or the third information includes a set of first type model parameters and a plurality of sets of second type model parameters, the set of model parameters is used for each cell in at least one fourth cell, and one set of second type model parameters among the sets of second type model parameters is used for one cell in the at least one fourth cell.

Optionally, in some embodiments, the at least one fourth cell includes part of or all cells in the at least one first cell reported by the device.

Optionally, the third information is transmitted through upper layer signaling and/or a broadcast message.

Optionally, in some embodiments, the third information includes second parameter indication information, and the second parameter indication information is configured for indicating an input parameter type of the second model.

Optionally, the input parameter type of the second model includes at least one as follows:

the channel quality information of the source cell of the device, the channel quality information of the neighboring cell of the source cell, the channel quality change information of the source cell, the channel quality change information of the neighboring cell, the topology information of the source cell, the topology information of the neighboring cell, the speed information of the device, the speed information of the source cell, the speed information of the neighboring cell, the moving direction information of the device, the direction information of the source cell, the direction information of the neighboring cell, and the historical handover information.

Optionally, the neighboring cell is a cell in at least one fourth cell, and the at least one fourth cell includes part of or all cells in at least one first cell reported by the device.

Optionally, in some embodiments, the device further includes the following:

a communication circuit, used for reporting second capability information, where the second capability information is used for indicating whether the device supports cell handover according to the second model.

Optionally, in some embodiments, the device further includes: the communication circuit, used for reporting fifth information, where the fifth information includes at least one as follows:

the channel quality information of the source cell of the device, the channel quality information of the neighboring cell of the source cell, the channel quality change information of the source cell, the channel quality change information of the neighboring cell, the topology information of the source cell, the topology information of the neighboring cell, the speed information of the device, the speed information of the source cell, the speed information of the neighboring cell, the moving direction information of the device, the direction information of the source cell, the direction information of the neighboring cell, and the historical handover information.

Optionally, the communication circuit is further used for reporting the fifth information to the second node.

Optionally, in some embodiments, the device further includes the following:

the communication circuit, used for reporting sixth information, where the sixth information is used for indicating a third model parameter.

Optionally, in some embodiments, the third model parameter includes at least one as follows: a number of layers of a neural network, a weight coefficient in the neural network, bias information, and activation function information.

Optionally, in some embodiments, the third model parameter includes at least one as follows: a number of layers of a convolutional neural network, parameter information of each layer in the convolutional neural network, convolution kernel information, a convolution kernel step length, and a pooling layer parameter.

Optionally, the communication circuit is specifically used for reporting the sixth information to the second node.

Optionally, in some embodiments, the device is a terminal device, and the second node is a network device of a source cell where the terminal device is located; or the device is a first terminal, and the second node is a second terminal.

Optionally, in some embodiments, the model parameters include at least one as follows: a number of layers of a neural network, a weight coefficient in the neural network, bias information, and activation function information.

Optionally, in some embodiments, the model parameters include at least one as follows:

a number of layers of a convolutional neural network, parameter information of each layer in the convolutional neural network, convolution kernel information, a convolution kernel step length, and a pooling layer parameter.

It should be understood that the device 400 according to the embodiments of the disclosure may correspond to the first node in the method embodiments of the disclosure, the foregoing and other operations and/or functions of each unit in the device 400 are to implement the corresponding process of the first node in the method 200 shown in FIG. 4, and description thereof is not repeated herein for brevity.

FIG. 7 is a schematic block view of a wireless communication device according to an embodiment of the disclosure. A device 500 shown in FIG. 7 includes the following:

a communication circuit 510, used for sending first indication information to a first node, where the first indication information is used for indicating model parameters, and the first indication information is used for determining information of at least one cell by the first node.

Optionally, in some embodiments, the first indication information includes first information, the first information is used for indicating a first model parameter, and the first information is used for determining a first model.

Optionally, in some embodiments, the device further includes the following:
 a determination circuit, used for determining the first information according to at least one as follows:
 channel quality information of a source cell of the first node, channel quality information of a neighboring cell of the source cell, channel quality change information of the source cell, channel quality change information of the neighboring cell, topology information of the source cell, topology information of the neighboring cell, speed information of the first node, speed information of the source cell, speed information of the neighboring cell, moving direction information of the first node, direction information of the source cell, direction information of the neighboring cell, and historical handover information.

Optionally, in some embodiments, the first information includes a set of model parameters, and the set of model parameters is used for a plurality of cells on a plurality of frequency points; or
 the first information includes a plurality of sets of model parameters, and one set of model parameters among the sets of model parameters is used for a cell on a frequency point; or
 the first information includes a set of first type model parameters and a plurality of sets of second type model parameters, the first type model parameters are used for a plurality of cells on a plurality of frequency points, and one set of second type model parameters among the sets of second type model parameters is used for a cell on a frequency point; or
 the first information includes a set of first type model parameters and a plurality of sets of second type model parameters, the first type model parameters are used for a plurality of cells on a plurality of frequency points, and the sets of second type model parameters are used for different cells on a same frequency point.

Optionally, the first information is transmitted through upper layer signaling and/or a broadcast message.

Optionally, in some embodiments, the communication circuit is further configured for:
 receiving first capability information reported by the first node, where the first capability information is used for indicating whether the first node supports cell reporting according to the first model.

Optionally, in some embodiments, the communication circuit is further configured for: sending the first information to the first node if the first node supports cell reporting according to the first model.

Optionally, in some embodiments, the communication circuit is further configured for:
 sending fourth information to the first node, where the fourth information includes at least part of the model parameters corresponding to the first model, and the fourth information is used for updating the first model by the first node.

Optionally, in some embodiments, the first indication information includes a plurality of pieces of first information, and the pieces of first information are used for determining a plurality of first models.

Optionally, in some embodiments, the communication circuit is further configured for: sending activation signaling to the first node, where the activation signaling is used for activating at least one first model among the first models.

Optionally, the activation signaling is one as follows: downlink control information DCI, radio resource control RRC signaling, and medium access control MAC control element CE.

Optionally, the communication circuit is further used for receiving second information reported by the first node, where the second information includes the information of the at least one first cell. The at least one first cell is determined by the first node according to the first model.

Optionally, in some embodiments, the second information further includes: a measurement result of the at least one first cell and/or priority information of the at least one first cell.

Optionally, in some embodiments, the first information includes first parameter indication information, and the first parameter indication information is configured for indicating an input parameter type of the first model.

Optionally, the input parameter type of the first model includes at least one as follows:
 the channel quality information of the source cell of the first node, the channel quality information of the neighboring cell of the source cell, the channel quality change information of the source cell, the channel quality change information of the neighboring cell, the topology information of the source cell, the topology information of the neighboring cell, the speed information of the first node, the speed information of the source cell, the speed information of the neighboring cell, the moving direction information of the first node, the direction information of the source cell, the direction information of the neighboring cell, and the historical handover information.

Optionally, in some embodiments, the first indication information includes third information, the third information is used for indicating a second model parameter, and the third information is used for determining a second model.

Optionally, in some embodiments, the device further includes the following:
 a determination circuit, used for determining the third information according to at least one as follows:
 the channel quality information of the source cell of the first node, the channel quality information of the neighboring cell of the source cell, the channel quality change information of the source cell, the channel quality change information of the neighboring cell, the topology information of the source cell, the topology information of the neighboring cell, the speed information of the first node, the speed information of the source cell, the speed information of the neighboring cell, the moving direction information of the first node, the direction information of the source cell, the direction information of the neighboring cell, and the historical handover information.

Optionally, in some embodiments, the third information includes second parameter indication information, and the second parameter indication information is configured for indicating an input parameter type of the second model.

Optionally, the input parameter type of the second model includes at least one as follows:

the channel quality information of the source cell of the first node, the channel quality information of the neighboring cell of the source cell, the channel quality change information of the source cell, the channel quality change information of the neighboring cell, the topology information of the source cell, the topology information of the neighboring cell, the speed information of the first node, the speed information of the source cell, the speed information of the neighboring cell, the moving direction information of the first node, the direction information of the source cell, the direction information of the neighboring cell, and the historical handover information.

Optionally, the neighboring cell is a cell in at least one fourth cell, and the at least one fourth cell includes part of or all cells in the at least one first cell reported by the first node.

Optionally, in some embodiments, the third information includes a set of model parameters, and the set of model parameters is used for each cell in at least one fourth cell; or
the third information includes a plurality of sets of model parameters, and one set of model parameters among the sets of model parameters is used for one cell in at least one fourth cell; or
the third information includes a set of first type model parameters and a plurality of sets of second type model parameters, the set of model parameters is used for each cell in at least one fourth cell, and one set of second type model parameters among the sets of second type model parameters is used for one cell in the at least one fourth cell.

Optionally, in some embodiments, the at least one fourth cell includes part of or all cells in the at least one first cell reported by the first node.

Optionally, the third information is transmitted through upper layer signaling and/or a broadcast message.

Optionally, in some embodiments, the communication circuit is further configured for:
receiving second capability information reported by the first node, where the second capability information is used for indicating whether the first node supports cell handover according to the second model.

Optionally, the communication circuit is specifically used for: sending the third information to the first node if the first node supports cell handover according to the second model.

Optionally, the communication circuit is further used for: receiving fifth information sent by the first node, where the fifth information includes at least one as follows:
the channel quality information of the source cell of the first node, the channel quality information of the neighboring cell of the source cell, the channel quality change information of the source cell, the channel quality change information of the neighboring cell, the topology information of the source cell, the topology information of the neighboring cell, the speed information of the first node, the speed information of the source cell, the speed information of the neighboring cell, the moving direction information of the first node, the direction information of the source cell, the direction information of the neighboring cell, and historical handover information.

Optionally, in some embodiments, the communication circuit is further configured for:
receiving sixth information reported by the first node, where the sixth information is used for indicating a third model parameter.

Optionally, in some embodiments, the third model parameter includes at least one as follows: a number of layers of a neural network, a weight coefficient in the neural network, bias information, and activation function information.

Optionally, in some embodiments, the third model parameter includes at least one as follows: a number of layers of a convolutional neural network, parameter information of each layer in the convolutional neural network, convolution kernel information, a convolution kernel step length, and a pooling layer parameter.

Optionally, in some embodiments, the model parameters include at least one as follows: a number of layers of a neural network, a weight coefficient in the neural network, bias information, and activation function information.

Optionally, in some embodiments, the model parameters include at least one as follows: a number of layers of a convolutional neural network, parameter information of each layer in the convolutional neural network, convolution kernel information, a convolution kernel step length, and a pooling layer parameter.

Optionally, in some embodiments, the first node is a terminal device, and the device is a network device in the source cell of the first node; or
the first node is a first terminal, and the device is a second terminal.

It should be understood that the device 500 according to the embodiments of the disclosure may correspond to the first node in the method embodiments of the disclosure, the foregoing and other operations and/or functions of each unit in the device 500 are to implement the corresponding process of the second node in the method 300 shown in FIG. 5, and description thereof is not repeated herein for brevity.

Figure 8:
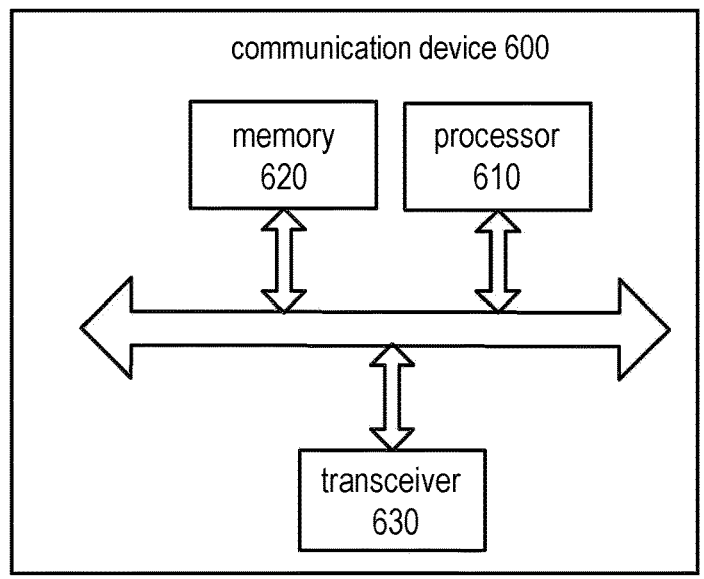
FIG. 8 is a schematic block view of a communication device provided by another embodiment of the disclosure.

FIG. 8 is a schematic view of a structure of a communication device 600 provided by an embodiment of the disclosure. The communication device 600 shown in FIG. 8 includes a processor 610, and the processor 610 may call and run a computer program from a memory to implement the method in the embodiments of the disclosure.

Optionally, as shown in FIG. 8, the communication device 600 may further include a memory 620. The processor 610 may call and run a computer program from the memory 620 to implement the method in the embodiments of the disclosure.

The memory 620 may be a separate device independent of the processor 610 or may be integrated in the processor 610.

Optionally, as shown in FIG. 8, the communication device 600 may further include a transceiver 630, and the processor 610 may control the transceiver 630 to communicate with other devices. Specifically, it can send information or data to other devices or receive information or data sent by other devices.

The transceiver 630 may include a transmitter and a receiver. The transceiver 630 may further include an antenna, and a number of antennas may be one or more.

Optionally, the communication device 600 may specifically be the second node in the embodiments of the disclosure, and the communication device 600 may implement the corresponding processes implemented by the second node in the various methods in the embodiments of the disclosure. For the sake of brevity, description thereof is not repeated herein.

Optionally, the communication device 600 may specifically be the mobile terminal/first node in the embodiments of the disclosure, and the communication device 600 may implement the corresponding processes implemented by the mobile terminal/first node in the various methods in the embodiments of the disclosure. For the sake of brevity, description thereof is not repeated herein.

Figure 9:
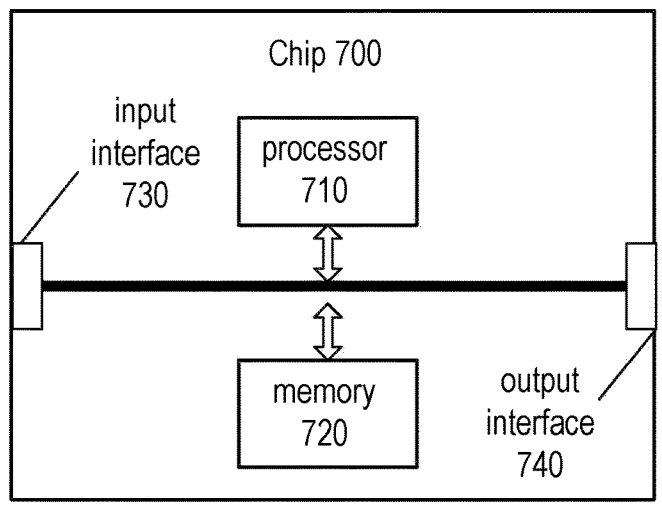
FIG. 9 is a schematic block view of a chip provided by an embodiment of the disclosure.

FIG. 9 is a schematic view of a structure of a chip according to an embodiment of the disclosure. A chip 700 shown in FIG. 9 includes a processor 710, and the processor 710 may call and run a computer program from a memory to implement the method in the embodiments of the disclosure.

Optionally, as shown in FIG. 9, the chip 700 may further include a memory 720. The processor 710 may call and run a computer program from the memory 720 to implement the method in the embodiments of the disclosure.

The memory 720 may be a separate device independent of the processor 710 or may be integrated in the processor 710.

Optionally, the chip 700 may further include an input interface 730. The processor 710 may control the input interface 730 to communicate with other devices or chips, and specifically, may obtain information or data sent by other devices or chips.

Optionally, the chip 700 may further include an output interface 740. The processor 710 may control the output interface 740 to communicate with other devices or chips, and specifically, may output information or data to other devices or chips.

Optionally, the chip may be applied to the second node in the embodiments of the disclosure, and the chip may implement the corresponding processes implemented by the second node in the various methods in the embodiments of the disclosure. For the sake of brevity, description thereof is not repeated herein.

Optionally, the chip may be applied to the mobile terminal/first node in the embodiments of the disclosure, and the chip may implement the corresponding processes implemented by the mobile terminal/first node in the various methods in the embodiments of the disclosure. For the sake of brevity, description thereof is not repeated herein.

It should be understood that the chip mentioned in the embodiments of the disclosure may also be referred to as a system-level chip or a system on a chip.

Figure 10:
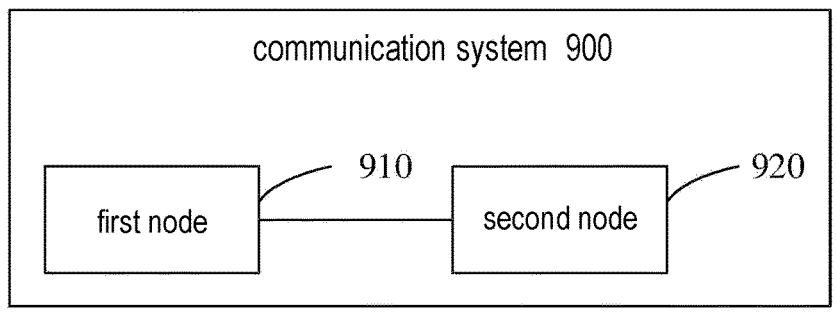
FIG. 10 is a schematic block view of a communication system provided by an embodiment of the disclosure.

FIG. 10 is a schematic block view of a communication system 900 provided by an embodiment of the disclosure. As shown in FIG. 10, the communication system 900 includes a first node 910 and a second node 920.

The first node 910 may be used to implement the corresponding functions implemented by the first node in the foregoing method, and the second node 920 may be used to implement the corresponding functions implemented by the second node in the foregoing method. For the sake of brevity, description thereof is not repeated herein.

It should be understood that the processor of the embodiments of the disclosure may be an integrated circuit chip with signal processing capability. In the implementation process, the steps of the foregoing method in the embodiments may be completed by an integrated logic circuit of hardware or an instruction in the form of software in the processor. The processor may be a general-purpose processor, a digital signal processor (DSP), an application specific integrated circuit (ASIC), a field programmable gate array (FPGA), or other components such as a programmable logic device, a discrete gate, a transistor logic device, and a discrete hardware component. The processor may implement or execute various methods, steps, and logical block views disclosed in the embodiments of the disclosure. The general-purpose processor may be a microprocessor, or the processor may be any conventional processor and the like. The steps of the method disclosed in the embodiments of the disclosure may be directly implemented as being executed and completed by a hardware decoding processor, or may be executed and completed by a combination of hardware and software modules in a decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads the information in the memory and completes the steps of the foregoing method in combination with its hardware.

It may be understood that the memory in the embodiments of the disclosure may be a volatile memory or a non-volatile memory or may include both the volatile memory and the non-volatile memory. The non-volatile memory may be a ready-only memory (ROM), a programmable ROM (PROM), an erasable PROM (EPROM), an electrically EPROM (EEPROM), or a flash memory. The volatile memory may be a random access memory (RAM) used as an external cache. By way of exemplary but not restrictive description, many forms of the RAM are available, such as a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM), and a direct rambus RAM (DRRAM). It should be noted that the memory of the system and the method described herein is intended to include, but not limited to, these and any other suitable types of memories.

It should be understood that the above-mentioned memory is exemplary but not restrictive. For instance, the memory in the embodiments of the disclosure may also be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), and a direct rambus RAM (DR RAM) and the like. That is, the memory in the embodiments of the disclosure is intended to include, but not limited to, these and any other suitable types of memory.

The embodiments of the disclosure further provide a computer-readable storage medium configured for storing a computer program.

Optionally, the computer-readable storage medium may be applied to the network device in the embodiments of the disclosure, and the computer program causes a computer to execute the corresponding processes implemented by the network device in the various methods of the embodiments of the disclosure. For the sake of brevity, description thereof is not repeated herein.

Optionally, the computer-readable storage medium may be applied to the mobile terminal/terminal device in the embodiments of the disclosure, and the computer program causes a computer to execute the corresponding processes implemented by the mobile terminal/terminal device in the various methods of the embodiments of the disclosure. For the sake of brevity, description thereof is not repeated herein.

The embodiments of the disclosure further provide a computer program product including a computer program instruction.

Optionally, the computer program product may be applied to the network device in the embodiments of the disclosure, and the computer program instruction causes the computer to execute the corresponding processes implemented by the network device in the various methods of the embodiments of the disclosure. For the sake of brevity, description thereof is not repeated herein.

Optionally, the computer program product may be applied to the mobile terminal/terminal device in the embodiments of the disclosure, and the computer program instruction causes a computer to execute the corresponding processes implemented by the mobile terminal/terminal device in the various methods of the embodiments of the disclosure. For the sake of brevity, description thereof is not repeated herein.

The embodiments of the disclosure further provide a computer program.

Optionally, the computer program may be applied to the network device in the embodiments of the disclosure, and when running on a computer, the computer program causes the computer to execute the corresponding processes implemented by the network device in the various methods of the embodiments of the disclosure. For the sake of brevity, description thereof is not repeated herein.

Optionally, the computer program may be applied to the mobile terminal/terminal device in the embodiments of the disclosure, and when running on a computer, the computer program causes the computer to execute the corresponding processes implemented by the mobile terminal/terminal device in the various methods of the embodiments of the disclosure. For the sake of brevity, description thereof is not repeated herein.

A person having ordinary skill in the art may be aware that in combination with the disclosed embodiments, the described exemplary units and algorithm steps may be implemented by electronic hardware or a combination of computer software and electronic hardware. Whether these functions are executed by hardware or software depends on the specific application and design constraint conditions of the technical solution. Professionals and technicians can use different methods for each specific application to implement the described functions, but such implementation should not be considered beyond the scope of the disclosure.

A person having ordinary skill in the art may clearly understand that, for the convenience and brevity of description, the specific working process of the abovementioned system, device, and unit may refer to the corresponding processes in the foregoing method embodiments, which are not repeated herein.

In the several embodiments provided in the disclosure, it should be understood that the disclosed system, device, and method may be implemented in other ways. For instance, the device embodiments described above are only illustrative. For instance, the division of the units is only a logical function division, and there may be other division methods in actual implementation. For instance, multiple units or components may be combined or integrated into another system, or some features may be omitted or may not be implemented. In addition, the displayed or discussed mutual coupling or direct coupling or communication connection may be implemented through some interfaces, and the indirect coupling or communication connection of the device or units may be in electrical, mechanical, or other forms.

The units described as separate components may or may not be physically separated, and the components displayed as units may or may not be physical units, that is, they may be located in one place, or they may be distributed on multiple network units. Some of or all of the units may be selected according to actual needs to achieve the objectives of the solutions of the embodiments.

In addition, in the embodiments of the disclosure, each functional unit may be integrated into one processing unit, or each unit may exist alone physically, or two or more units may be integrated into one unit.

If the function is implemented in the form of a software functional unit and sold or used as an independent product, it may be stored in a computer-readable storage medium. Based on this understanding, regarding the technical solution of the disclosure, the part that contributes to the related art or the part of the technical solution may be embodied in the form of a software product in essence. The computer software product is stored in a storage medium and includes a number of instructions to enable a computer device (which may be a personal computer, a server, or the second node and the like) to execute all or part of the steps of the method described in the various embodiments of the disclosure. The aforementioned storage medium includes a U disk, a mobile hard disk, a read-only memory (ROM), a random access memory (RAM), a magnetic disk, an optical disk, or other media that may store program codes.

The above are only specific implementations of the disclosure, but the protection scope of the disclosure is not limited thereto. A person having ordinary skill in the art may easily think of changes or substitutions within the technical scope disclosed in the disclosure, and these changes or substitutions should be covered by the protection scope of the disclosure. Therefore, the protection scope of the disclosure shall be subject to the protection scope of the claims.

What is claimed is:

1. A wireless communication method, comprising:
    determining information of at least one cell according to first indication information by a first node, wherein the first indication information is used for indicating model parameters;
    constructing, by the first node, a model based on the model parameters indicated by the first indication, wherein the information of the at least one cell is determined according to the model, and the model comprises a first model;
    wherein the first indication information comprises first information, the first information is used for indicating a first model parameter, and the first information is used for determining the first model;
    wherein the step of determining the information of the at least one cell according to the first indication information further comprises:
        determining information of at least one first cell according to the first model, wherein the at least one cell comprises the at least one first cell;
    wherein the step of determining the information of the at least one first cell according to the first model further comprises:
        determining first output information according to the first model by the first node, and
        determining the information of the at least one first cell according to the first output information, or determining the information of the at least one first cell according to the first model by the first node.

2. The method according to claim 1,
    wherein the step of determining the first output information according to the first model by the first node further comprises:
    inputting at least one of channel quality information of a source cell of the first node, channel quality information of a neighboring cell of the source cell, channel quality change information of the source cell, channel quality change information of the neighboring cell, topology information of the source cell, topology information of the neighboring cell, speed information of the first node, speed information of the source cell, speed information of the neighboring cell, moving direction information of the first node, direction information of the source cell, direction information of the neighboring cell, and historical handover information to the first model to obtain the first output information by the first node;

wherein the first output information comprises at least one as follows:

a first triggering condition, information of at least one second cell, and priority information of the at least one second cell;

wherein the at least one first cell comprises a cell satisfying the first triggering condition;

wherein the first triggering condition comprises at least one as follows:

a channel quality threshold of a serving cell is less than a first threshold;

a channel quality threshold of the neighboring cell is greater than a second threshold; and a difference value between channel quality of the serving cell and channel quality of the neighboring cell is less than a third threshold;

wherein the at least one first cell comprises part of or all cells in the at least one second cell.

3. The method according to claim 1, wherein the first information comprises a set of model parameters, and the set of model parameters is used for a plurality of cells on a plurality of frequency points; or the first information comprises a plurality of sets of model parameters, and one set of model parameters among the sets of model parameters is used for a cell on a frequency point; or the first information comprises a set of first type model parameters and a plurality of sets of second type model parameters, the first type model parameters are used for a plurality of cells on a plurality of frequency points, and one set of second type model parameters among the sets of second type model parameters is used for a cell on a frequency point; or the first information comprises a set of first type model parameters and a plurality of sets of second type model parameters, the first type model parameters are used for a plurality of cells on a plurality of frequency points, and the sets of second type model parameters are used for different cells on a same frequency point;

wherein the first information is configured by a second node; or part of information in the first information is configured by the second node, and other information in the first information is pre-configured; or the first information is pre-configured;

wherein the first information is transmitted through upper layer signaling and/or a broadcast message;

wherein the method further comprises:

reporting first capability information by the first node, wherein the first capability information is used for indicating whether the first node supports cell reporting according to the first model;

wherein the method further comprises:

receiving fourth information by the first node, wherein the fourth information comprises at least part of the model parameters corresponding to the first model; and updating the first model according to the fourth information by the first node.

4. The method according to claim 1, wherein the first indication information comprises a plurality of pieces of first information, and the pieces of first information are used for determining a plurality of first models;

wherein the method further comprises:

receiving activation signaling by the first node, wherein the activation signaling is used for activating at least one first model among the first models;

wherein the activation signaling is one as follows:

downlink control information (DCI), radio resource control (RRC) signaling, and medium access control (MAC) control element (CE);

wherein the method further comprises: reporting second information by the first node, wherein the second information comprises the information of the at least one first cell;

wherein the second information further comprises: a measurement result of the at least one first cell and/or priority information of the at least one first cell;

wherein the first information comprises first parameter indication information, and the first parameter indication information is configured for indicating an input parameter type of the first model;

wherein the input parameter type of the first model comprises at least one as follows:

channel quality information of a source cell of the first cell, channel quality information of a neighboring cell of the source cell, channel quality change information of the source cell, channel quality change information of the neighboring cell, topology information of the source cell, topology information of the neighboring cell, speed information of the first node, speed information of the source cell, speed information of the neighboring cell, moving direction information of the first node, direction information of the source cell, direction information of the neighboring cell, and historical handover information.

5. The method according to claim 1, wherein the first indication information comprises third information, the third information is used for indicating a second model parameter, and the third information is used for determining a second model;

wherein the step of determining the information of the at least one cell according to the first indication information by the first node further comprises:

determining information of at least one third cell according to the second model by the first node, wherein the at least one cell comprises the at least one third cell;

wherein the step of determining the information of the at least one third cell according to the second model by the first node further comprises:

determining second output information according to the second model and determining the information of the at least one third cell according to the second output information by the first node; or determining the information of the at least one third cell according to the second model by the first node;

wherein the step of determining the second output information according to the second model by the first node further comprises:

inputting at least one of the channel quality information of the source cell of the first node, channel quality information of a neighboring cell of a source cell, the channel quality change information of the source cell, channel quality change information of the neighboring cell, the topology information of the source cell, topology information of the neighboring cell, the speed information of the first node, the speed information of the source cell, speed information of the neighboring cell, the moving direction information of the first node, the direction information of the source cell, direction information of the neighboring cell, and the historical handover information to the second model to obtain the second output information by the first node;

wherein the second output information comprises at least one as follows: a second triggering condition and information of at least one fifth cell;

wherein the at least one third cell comprises part of or all cells in the at least one fifth cell;

wherein the at least one third cell comprises a cell satisfying the second triggering condition;

wherein the second triggering condition comprises at least one as follows:

channel quality of a target cell is greater than a first threshold value, a difference value between the channel quality of the target cell and the channel quality of the serving cell is greater than a second threshold value, and the channel quality of the serving cell is less than a third threshold value;

wherein the method further comprises: initiating random access to a cell in the at least one third cell by the first node.

6. The method according to claim 5, wherein the third information comprises a set of model parameters, and the set of model parameters is used for each cell in at least one fourth cell; or the third information comprises a plurality of sets of model parameters, and one set of model parameters among the sets of model parameters is used for one cell in at least one fourth cell; or the third information comprises a set of first type model parameters and a plurality of sets of second type model parameters, the set of model parameters is used for each cell in at least one fourth cell, and one set of second type model parameters among the sets of second type model parameters is used for one cell in the at least one fourth cell;

wherein the at least one fourth cell comprises part of or all cells in the at least one first cell reported by the first node;

wherein the third information is transmitted through upper layer signaling and/or a broadcast message;

wherein the third information comprises second parameter indication information, and the second parameter indication information is configured for indicating an input parameter type of the second model;

wherein the input parameter type of the second model comprises at least one as follows:

the channel quality information of the source cell of the first node, the channel quality information of the neighboring cell of the source cell, the channel quality change information of the source cell, the channel quality change information of the neighboring cell, the topology information of the source cell, the topology information of the neighboring cell, the speed information of the first node, the speed information of the source cell, the speed information of the neighboring cell, the moving direction information of the first node, the direction information of the source cell, the direction information of the neighboring cell, and the historical handover information;

wherein the neighboring cell is a cell in at least one fourth cell, and the at least one fourth cell comprises part of or all cells in the at least one first cell reported by the first node;

wherein the method further comprises:

reporting second capability information by the first node, wherein the second capability information is used for indicating whether the first node supports cell handover according to the second model.

7. The method according to claim 1, wherein the method further comprises:

reporting fifth information by the first node, wherein the fifth information comprises at least one as follows:

channel quality information of a source cell of the first node, channel quality information of a neighboring cell of the source cell, channel quality change information of the source cell, channel quality change information of the neighboring cell, topology information of the source cell, topology information of the neighboring cell, speed information of the first node, speed information of the source cell, speed information of the neighboring cell, moving direction information of the first node, direction information of the source cell, direction information of the neighboring cell, and historical handover information;

wherein the step of reporting the fifth information by the first node further comprises:

reporting the fifth information to the second node by the first node.

8. The method according to claim 1, wherein the method further comprises:

reporting sixth information by the first node, wherein the sixth information is used for indicating a third model parameter;

wherein the third model parameter comprises at least one as follows: a number of layers of a neural network, a weight coefficient in the neural network, bias information, and activation function information;

wherein the third model parameter comprises at least one as follows: a number of layers of a convolutional neural network, parameter information of each layer in the convolutional neural network, convolution kernel information, a convolution kernel step length, and a pooling layer parameter;

wherein the step of reporting the sixth information by the first node further comprises:

reporting the sixth information to the second node by the first node;

wherein the first node is a terminal device, and the second node is a network device of a source cell where the terminal device is located; or the first node is a first terminal, and the second node is a second terminal;

wherein the model parameters comprise at least one as follows: a number of layers of a neural network, a weight coefficient in the neural network, bias information, and activation function information;

wherein the model parameters comprise at least one as follows: a number of layers of a convolutional neural network, parameter information of each layer in the convolutional neural network, convolution kernel information, a convolution kernel step length, and a pooling layer parameter.

9. A wireless communication method, comprising:

sending, by a second node, first indication information to a first node; and determining, by the first node, information of at least one cell according to the first indication information, wherein the first indication information is used for indicating model parameters, constructing, by the first node, a model based on the model parameters indicated by the first indication, wherein the information of the at least one cell is determined according to the model, and the model comprises a first model;

wherein the first indication information comprises first information, the first information is used for indicating a first model parameter, and the first information is used for determining the first model;

wherein determining the information of the at least one cell according to the first indication information further comprises:

determining, by the first node, information of at least one first cell according to the first model, wherein the at least one cell comprises the at least one first cell;

wherein determining the information of the at least one first cell according to the first model further comprises:

determining, by the first node, first output information according to the first model, and determining, by the first node, the information of the at least one first cell according to the first output information, or determining, by the first node, the information of the at least one first cell according to the first model.

10. The method according to claim 9, wherein the method further comprises:

determining the first information by the second node according to at least one as follows:

channel quality information of a source cell of the first node, channel quality information of a neighboring cell of the source cell, channel quality change information of the source cell, channel quality change information of the neighboring cell, topology information of the source cell, topology information of the neighboring cell, speed information of the first node, speed information of the source cell, speed information of the neighboring cell, moving direction information of the first node, direction information of the source cell, direction information of the neighboring cell, and historical handover information;

wherein the first information comprises a set of model parameters, and the set of model parameters is used for a plurality of cells on a plurality of frequency points; or the first information comprises a plurality of sets of model parameters, and one set of model parameters among the sets of model parameters is used for a cell on a frequency point; or the first information comprises a set of first type model parameters and a plurality of sets of second type model parameters, the first type model parameters are used for a plurality of cells on a plurality of frequency points, and one set of second type model parameters among the sets of second type model parameters is used for a cell on a frequency point; or the first information comprises a set of first type model parameters and a plurality of sets of second type model parameters, the first type model parameters are used for a plurality of cells on a plurality of frequency points, and the sets of second type model parameters are used for different cells on a same frequency point;

wherein the first information is transmitted through upper layer signaling and/or a broadcast message;

wherein the method further comprises:

receiving first capability information reported by the first node by the second node, wherein the first capability information is used for indicating whether the first node supports cell reporting according to the first model;

wherein the step of sending the first indication information to the first node by the second node further comprises:

sending the first information to the first node by the second node if the first node supports the cell reporting according to the first mode;

wherein the method further comprises:

sending fourth information to the first node by the second node, wherein the fourth information comprises at least part of the model parameters corresponding to the first model, and the fourth information is used for updating the first model by the first node;

wherein the first indication information comprises a plurality of pieces of first information, and the pieces of first information are used for determining a plurality of first models;

wherein the method further comprises:

sending activation signaling to the first node by the second node, wherein the activation signaling is used for activating at least one first model among the first models;

wherein the activation signaling is one as follows:

downlink control information (DCI), radio resource control (RRC) signaling, and medium access control (MAC) control element (CE);

wherein the method further comprises:

receiving second information reported by the first node by the second node, wherein the second information comprises the information of the at least one first cell, wherein the at least one first cell is determined by the first node according to the first model;

wherein the second information further comprises: a measurement result of the at least one first cell and/or priority information of the at least one first cell;

wherein the first information comprises first parameter indication information, and the first parameter indication information is configured for indicating an input parameter type of the first model;

wherein the input parameter type of the first model comprises at least one as follows:

channel quality information of a source cell of the first node, channel quality information of a neighboring cell of the source cell, channel quality change information of the source cell, channel quality change information of the neighboring cell, topology information of the source cell, topology information of the neighboring cell, speed information of the first node, speed information of the source cell, speed information of the neighboring cell, moving direction information of the first node, direction information of the source cell, direction information of the neighboring cell, and historical handover information.

11. The method according to claim 9, wherein the first indication information comprises third information, the third information is used for indicating a second model parameter, and the third information is used for determining a second model;

wherein the method further comprises:

determining the third information by the second node according to at least one as follows:

channel quality information of a source cell of the first node, channel quality information of a neighboring cell of the source cell, channel quality change information of the source cell, channel quality change information of the neighboring cell, topology information of the source cell, topology information of the neighboring cell, speed information of the first node, speed information of the source cell, speed information of the neighboring cell, moving direction information of the first node, direction information of the source cell, direction information of the neighboring cell, and historical handover information;

wherein the third information comprises second parameter indication information, and the second parameter indication information is configured for indicating an input parameter type of the second model;

wherein the input parameter type of the second model comprises at least one as follows:

channel quality information of a source cell of the first node, channel quality information of a neighboring cell of the source cell, channel quality change information of the source cell, channel quality change information of the neighboring cell, topology information of the source cell, topology information of the neighboring cell, speed information of the first node, speed information of the source cell, speed information of the neighboring cell, moving direction information of the first node, direction information of the source cell, direction information of the neighboring cell, and historical handover information;

wherein the neighboring cell is a cell in at least one fourth cell, and the at least one fourth cell comprises part of or all cells in the at least one first cell reported by the first node;

wherein the third information comprises a set of model parameters, and the set of model parameters is used for each cell in at least one fourth cell; or the third information comprises a plurality of sets of model parameters, and one set of model parameters among the sets of model parameters is used for one cell in at least one fourth cell; or the third information comprises a set of first type model parameters and a plurality of sets of second type model parameters, the set of model parameters is used for each cell in at least one fourth cell, and one set of second type model parameters among the sets of second type model parameters is used for one cell in the at least one fourth cell;

wherein the at least one fourth cell comprises part of or all cells in the at least one first cell reported by the first node;

wherein the third information is transmitted through upper layer signaling and/or a broadcast message;

wherein the method further comprises:

receiving second capability information reported by the first node by the second node, wherein the second capability information is used for indicating whether the first node supports cell handover according to the second model;

wherein the method further comprises:

sending the third information to the first node by the second node if the first node supports the cell handover according to the second model.

12. The method according to claim 9, wherein the method further comprises:

receiving fifth information sent by the first node by the second node, wherein the fifth information comprises at least one as follows:

channel quality information of a source cell of the first node, channel quality information of a neighboring cell of the source cell, channel quality change information of the source cell, channel quality change information of the neighboring cell, topology information of the source cell, topology information of the neighboring cell, speed information of the first node, speed information of the source cell, speed information of the neighboring cell, moving direction information of the first node, direction information of the source cell, direction information of the neighboring cell, and historical handover information;

wherein the method further comprises:

reporting sixth information by the first node, wherein the sixth information is used for indicating a third model parameter;

wherein the third model parameter comprises at least one as follows: a number of layers of a neural network, a weight coefficient in the neural network, bias information, and activation function information;

wherein the third model parameter comprises at least one as follows: a number of layers of a convolutional neural network, parameter information of each layer in the convolutional neural network, convolution kernel information, a convolution kernel step length, and a pooling layer parameter.

13. The method according to claim 9, wherein the model parameters comprise at least one as follows: a number of layers of a neural network, a weight coefficient in the neural network, bias information, and activation function information;

wherein the model parameters comprise at least one as follows: a number of layers of a convolutional neural network, parameter information of each layer in the convolutional neural network, convolution kernel information, a convolution kernel step length, and a pooling layer parameter;

wherein the first node is a terminal device, and the second node is a network device in the source cell of the first node; or the first node is a first terminal, and the second node is a second terminal.

14. A wireless communication device, comprising:

a determination circuit, used for determining information of at least one cell according to first indication information, wherein the first indication information is used for indicating model parameters, wherein the model parameters indicated by the first indication are used, by the wireless communication device, to construct a model, wherein the information according to the at least one cell is determined according to the model, and the model comprises a first model;

wherein the first indication information comprises first information, the first information is used for indicating a first model parameter, and the first information is used for determining the first model;

wherein determining the information of the at least one cell according to the first indication information further comprises:

determining information of at least one first cell according to the first model, wherein the at least one cell comprises the at least one first cell;

wherein determining the information of the at least one first cell according to the first model further comprises:

determining first output information according to the first model by the first node, and determining the information of the at least one first cell according to the first output information, or determining the information of the at least one first cell according to the first model by the first node.

15. The device according to claim 14, wherein the determination circuit is further used for:

inputting at least one of channel quality information of a source cell of the device, channel quality information of a neighboring cell of the source cell, channel quality change information of the source cell, channel quality change information of the neighboring cell, topology information of the source cell, topology information of the neighboring cell, speed information of the device, speed information of the source cell, speed information of the neighboring cell, moving direction information of the device, direction information of the source cell, direction information of the neighboring cell, and historical handover information to the first model to obtain the first output information;

wherein the first output information comprises at least one as follows:

a first triggering condition, information of at least one second cell, and priority information of the at least one second cell;

wherein the at least one first cell comprises a cell satisfying the first triggering condition;

wherein the first triggering condition comprises at least one as follows:

a channel quality threshold of a serving cell is less than a first threshold;

a channel quality threshold of the neighboring cell is greater than a second threshold; and a difference value between channel quality of the serving cell and channel quality of the neighboring cell is less than a third threshold;

wherein the at least one first cell comprises part of or all cells in the at least one second cell;

wherein the first information comprises a set of model parameters, and the set of model parameters is used for a plurality of cells on a plurality of frequency points; or the first information comprises a plurality of sets of model parameters, and one set of model parameters among the sets of model parameters is used for a cell on a frequency point; or the first information comprises a set of first type model parameters and a plurality of sets of second type model parameters, the first type model parameters are used for a plurality of cells on a plurality of frequency points, and one set of second type model parameters among the sets of second type model parameters is used for a cell on a frequency point; or the first information comprises a set of first type model parameters and a plurality of sets of second type model parameters, the first type model parameters are used for a plurality of cells on a plurality of frequency points, and the sets of second type model parameters are used for different cells on a same frequency point;

wherein the first information is configured by a second node; or part of information in the first information is configured by the second node, and other information in the first information is pre-configured; or the first information is pre-configured;

wherein the first information is transmitted through upper layer signaling and/or a broadcast message;

wherein the method device further comprises:

a communication circuit, used for reporting first capability information, wherein the first capability information is used for indicating whether the device supports cell reporting according to the first model.

16. The device according to claim 14, wherein the device further comprises:

a communication circuit, used for receiving fourth information, wherein the fourth information comprises at least part of the model parameters corresponding to the first model;

wherein the determination circuit is further used for updating the first model according to the fourth information;

wherein the first indication information comprises a plurality of pieces of first information, and the pieces of first information are used for determining a plurality of first models.

17. The device according to claim 14, further comprising:

a communication module, receiving activation signaling, wherein the activation signaling is used for activating at least one first model among the first models;

wherein the activation signaling is one as follows:

downlink control information (DCI), radio resource control (RRC) signaling, and medium access control (MAC) control element (CE).

18. The device according to claim 14, wherein the device further comprises: a communication circuit, used for reporting second information, wherein the second information comprises the information of the at least one first cell;

wherein the second information further comprises: a measurement result of the at least one first cell and/or priority information of the at least one first cell;

wherein the first information comprises first parameter indication information, and the first parameter indication information is configured for indicating an input parameter type of the first model;

wherein the input parameter type of the first model comprises at least one as follows:

the channel quality information of the source cell of the device, the channel quality information of a neighboring cell of the source cell, the channel quality change information of the source cell, the channel quality change information of the neighboring cell, the topology information of the source cell, the topology information of the neighboring cell, the speed information of the device, the speed information of the source cell, the speed information of the neighboring cell, the moving direction information of the device, the direction information of the source cell, the direction information of the neighboring cell, and the historical handover information;

wherein the first indication information comprises third information, the third information is used for indicating a second model parameter, and the third information is used for determining a second model;

wherein the determination circuit is further used for:

determining information of at least one third cell according to the second model, wherein the at least one cell comprises the at least one third cell;

wherein the determination circuit is further used for:

determining second output information according to the second model and determining the information of the at least one third cell according to the second output information; or determining the information of the at least one third cell according to the second model;

wherein the determination circuit is further used for:

inputting at least one of the channel quality information of the source cell of the device, the channel quality information of a neighboring cell of the source cell, the channel quality change information of the source cell, the channel quality change information of the neighboring cell, the topology information of the source cell, the topology information of the neighboring cell, the speed information of the device, the speed information of the source cell, the speed information of the neighboring cell, the moving direction information of the device, the direction information of the source cell, the direction information of the neighboring cell, and the historical handover information to the second model to obtain the second output information;

wherein the second output information comprises at least one as follows:

a second triggering condition and information of at least one fifth cell;

wherein the at least one third cell comprises part of or all cells in the at least one fifth cell;

wherein the at least one third cell comprises a cell satisfying the second triggering condition;

wherein the second triggering condition comprises at least one as follows:

channel quality of a target cell is greater than a first threshold value, a difference value between the channel quality of the target cell and the channel quality of the serving cell is greater than a second threshold value, and the channel quality of the serving cell is less than a third threshold value.

19. The device according to claim 14, wherein the device further comprises:

a communication circuit, configured for initiating random access to a cell in the at least one third cell;

wherein the third information comprises a set of model parameters, and the set of model parameters is used for each cell in at least one fourth cell; or the third information comprises a plurality of sets of model parameters, and one set of model parameters among the sets of model parameters is used for one cell in at least one fourth cell; or the third information comprises a set of first type model parameters and a plurality of sets of second type model parameters, the set of model parameters is used for each cell in at least one fourth cell, and one set of second type model parameters among the sets of second type model parameters is used for one cell in the at least one fourth cell;

wherein the at least one fourth cell comprises part of or all cells in the at least one first cell reported by the device;

wherein the third information is transmitted through upper layer signaling and/or a broadcast message;

wherein the third information comprises second parameter indication information, and the second parameter indication information is configured for indicating an input parameter type of the second model;

wherein the input parameter type of the second model comprises at least one as follows:

the channel quality information of the source cell of the device, the channel quality information of a neighboring cell of the source cell, the channel quality change information of the source cell, the channel quality change information of the neighboring cell, the topology information of the source cell, the topology information of the neighboring cell, the speed information of the device, the speed information of the source cell, the speed information of the neighboring cell, the moving direction information of the device, the direction information of the source cell, the direction information of the neighboring cell, and the historical handover information;

wherein the neighboring cell is a cell in at least one fourth cell, and the at least one fourth cell comprises part of or all cells in the at least one first cell reported by the device.

20. The device according to claim 14, wherein the device further comprises:

a communication circuit, used for reporting second capability information, wherein the second capability information is used for indicating whether the device supports cell handover according to the second model;

wherein the device further comprises: the communication circuit, used for reporting fifth information, wherein the fifth information comprises at least one as follows:

the channel quality information of the source cell of the device, the channel quality information of a neighboring cell of the source cell, the channel quality change information of the source cell, the channel quality change information of the neighboring cell, the topology information of the source cell, the topology information of the neighboring cell, the speed information of the device, the speed information of the source cell, the speed information of the neighboring cell, the moving direction information of the device, the direction information of the source cell, the direction information of the neighboring cell, and the historical handover information;

wherein the communication circuit is further used for reporting the fifth information to the second node;

wherein the device further comprises:

the communication circuit, used for reporting sixth information, wherein the sixth information is used for indicating a third model parameter;

wherein the third model parameter comprises at least one as follows: a number of layers of a neural network, a weight coefficient in the neural network, bias information, and activation function information;

wherein the third model parameter comprises at least one as follows: a number of layers of a convolutional neural network, parameter information of each layer in the convolutional neural network, convolution kernel information, a convolution kernel step length, and a pooling layer parameter;

wherein the communication circuit is further used for reporting the sixth information to the second node;

wherein the device is a terminal device, and the second node is a network device of a source cell where the terminal device is located; or the device is a first terminal, and the second node is a second terminal;

wherein the model parameters comprise at least one as follows: a number of layers of a neural network, a weight coefficient in the neural network, bias information, and activation function information;

wherein the model parameters comprise at least one as follows: a number of layers of a convolutional neural network, parameter information of each layer in the convolutional neural network, convolution kernel information, a convolution kernel step length, and a pooling layer parameter.

* * * * *